US012164303B2

(12) United States Patent
Lee et al.

(10) Patent No.: US 12,164,303 B2
(45) Date of Patent: Dec. 10, 2024

(54) ELECTRONIC DEVICE HAVING MOVING MEANS AND OPERATING METHOD THEREFOR

(71) Applicant: SAMSUNG ELECTRONICS CO., LTD., Suwon-si (KR)

(72) Inventors: Heesae Lee, Suwon-si (KR); Seungyeon Choe, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 221 days.

(21) Appl. No.: 17/700,094

(22) Filed: Mar. 21, 2022

(65) Prior Publication Data

US 2022/0214695 A1 Jul. 7, 2022

Related U.S. Application Data

(63) Continuation of application No. PCT/KR2020/009241, filed on Jul. 14, 2020.

(30) Foreign Application Priority Data

Sep. 26, 2019 (KR) .......................... 10-2019-0119059

(51) Int. Cl.
G05D 1/00 (2024.01)
(52) U.S. Cl.
CPC ......... G05D 1/0231 (2013.01); G05D 1/0016 (2013.01); G05D 1/0022 (2013.01); G05D 1/0272 (2013.01); G05D 1/0274 (2013.01)
(58) Field of Classification Search
CPC .. G05D 1/0231; G05D 1/0016; G05D 1/0022; G05D 1/0272; G05D 1/0274
See application file for complete search history.

(56) References Cited

U.S. PATENT DOCUMENTS

| 7,324,870 B2 | 1/2008 | Lee |
| 7,412,311 B2 | 8/2008 | Georgi et al. |

(Continued)

FOREIGN PATENT DOCUMENTS

| JP | 2017-538208 A | 12/2017 |
| JP | 2018-504305 A | 2/2018 |

(Continued)

OTHER PUBLICATIONS

Communication dated Oct. 15, 2020, issued by the International Searching Authority in counterpart International Application No. PCT/KR2020/009241 (PCT/ISA/210 and PCT/ISA/237).

(Continued)

*Primary Examiner* — Peter D Nolan
*Assistant Examiner* — Mikko Okechukwu Obioha
(74) *Attorney, Agent, or Firm* — Sughrue Mion, PLLC

(57) ABSTRACT

An electronic device having a moving part is provided. The electronic device includes a moving part; a light emitting element; an optical sensor; a memory; a communication interface; and a controller configured to: based on the electronic device moving and being in a recording mode, output light from the light emitting element; receive the light reflected from a ground by the optical sensor; acquire information about a moving path of the electronic device based on the received light and store the information in the memory; and based on receiving a control signal for moving the electronic device along the moving path from a user terminal device through the communication interface, set an operation mode of the electronic device as a travel mode, and control the moving part so that the electronic device moves along the moving path.

11 Claims, 26 Drawing Sheets

(56) References Cited

U.S. PATENT DOCUMENTS

| | | | |
|---|---|---|---|
| 9,582,000 B2* | 2/2017 | Choe | A47L 9/2805 |
| 10,744,636 B2 | 8/2020 | Kim et al. | |
| 2016/0147230 A1* | 5/2016 | Munich | B25J 5/007 |
| | | | 701/28 |
| 2017/0332859 A1 | 11/2017 | Nam et al. | |
| 2017/0341465 A1 | 11/2017 | Zdrahal et al. | |
| 2019/0146504 A1 | 5/2019 | Lee et al. | |
| 2022/0066456 A1* | 3/2022 | Ebrahimi Afrouzi | |
| | | | G06F 3/04883 |
| 2024/0017559 A1* | 1/2024 | Tanaka | B41J 29/02 |

FOREIGN PATENT DOCUMENTS

| | | | |
|---|---|---|---|
| KR | 10-0515394 B1 | 9/2005 | |
| KR | 10-2010-0041932 A | 4/2010 | |
| KR | 10-0996408 B1 | 11/2010 | |
| KR | 10-2011-0127945 A | 11/2011 | |
| KR | 10-1102994 B1 | 1/2012 | |
| KR | 10-1185041 B1 | 9/2012 | |
| KR | 10-2013-0027355 A | 3/2013 | |
| KR | 10-2015-0072273 A | 6/2015 | |
| KR | 10-2015-0134762 A | 12/2015 | |
| KR | 10-2031942 B1 | 11/2019 | |
| WO | 2016/085717 A1 | 6/2016 | |
| WO | 2017/191928 A1 | 11/2017 | |

OTHER PUBLICATIONS

Office Action issued on Oct. 18, 2024 by the Korean Patent Office for Korean Patent Application No. 10-2019-0119059.

\* cited by examiner

ELECTRONIC DEVICE HAVING MOVING MEANS AND OPERATING METHOD THEREFOR

CROSS-REFERENCE TO RELATED APPLICATION(S)

This application is a bypass continuation application of International PCT Application No. PCT/KR2020/009241, filed on Jul. 14, 2020, which is based on and claims priority to Korean Patent Application No. 10-2019-0119059, filed on Sep. 26, 2019, in the Korean Intellectual Property Office, the disclosures of which are incorporated by reference herein in their entirety.

BACKGROUND

1. Field

The disclosure relates to an electronic device having a moving part, and more particularly, to an electronic device that stores information about a path of movement that occurs manually or automatically, and moves based on the stored information.

2. Description of Related Art

Fixed-type objects are generally fixed to a specific object or location such as home appliances, furniture, flowerpots, etc. and are not easy to move or displace from their fixed locations using only manpower.

Accordingly, wheels are generally provided on such fixed-type objects to allow easy movement. However, when wheels are pressed by the heavy weight of a fixed-type object for a long time, the wheels may be damaged and their functions may be degraded. Even if a fixed-type object had wheels, it is still difficult to navigate the fixed-type object directly by manpower.

SUMMARY

The disclosure provides an electronic device that is attached to a fixed-type object, and can automatically move the fixed-type object.

Specifically, the disclosure provides an electronic device that records a moving path according to a user input, and moves the fixed-type object based on the recorded moving path.

According to an embodiment, there is provided an electronic device including: a moving part; a light emitting element; an optical sensor; a memory; a communication interface; and a controller configured to: based on the electronic device moving and being in a recording mode, output light from the light emitting element; receive the light reflected from a ground by the optical sensor; acquire information about a moving path of the electronic device based on the received light and store the information in the memory; and based on receiving a control signal for moving the electronic device along the moving path from a user terminal device through the communication interface, set an operation mode of the electronic device as a travel mode, and control the moving part so that the electronic device moves along the moving path.

The moving part includes a wheel for recording and a wheel for travelling, and the controller is further configured to: based on the electronic device moving by the wheel and being in the recording mode, acquire information about the moving path of the electronic device based on the received light and store the information in the memory; and based on receiving the control signal from the user terminal device through the communication interface, set the operation mode of the electronic device to the travel mode, and control the wheel for travelling so that the electronic device moves along the moving path.

The wheel for recording is attached to the electronic device through a suspension, and the wheel for travelling is attached to the electronic device without a suspension, and the controller is further configured to: based on the operation mode of the electronic device being a stand-by mode, control the wheel for recording and the wheel for travelling to be separated from the ground; based on the operation mode of the electronic device being changed from the stand-by mode to the recording mode, control the wheel for recording to descend in a direction toward the ground; and based on the operation mode of the electronic device being changed from the stand-by mode to the travel mode, control the wheel for recording and the wheel for travelling to descend in the direction toward the ground.

The moving part includes a first wheel for recording and a second wheel for recording and driving, and the controller is further configured to: based on the electronic device moving as the first wheel and the second wheel rotate according to an external force applied to the electronic device and being in the recording mode, acquire information about the moving path of the electronic device based on the received light and store the information in the memory; and based on receiving the control signal from the user terminal device through the communication interface, set the operation mode of the electronic device to the travel mode, and control the second wheel so that the electronic device moves along the moving path.

The controller is further configured to: based on receiving the control signal for moving the electronic device from the user terminal device through the communication interface, control the moving part so that the electronic device moves according to the received control signal, and acquire information about the moving path of the electronic device based on the received light and store the information in the memory.

The controller is further configured to: based on the operation mode of the electronic device being in the recording mode, acquire information about a plurality of moving paths and store the information in the memory; and control the moving part so that the electronic device moves along a moving path corresponding to the received control signal among the plurality of moving paths.

The controller is further configured to: acquire information about the moving path and a moving speed of the electronic device and store the information in the memory in the recording mode, and based on receiving the control signal for moving the electronic device along the moving path from a user terminal device through the communication interface, set the operation mode of the electronic device to the travel mode, and control the moving part so that the electronic device moves according to the moving path and the moving speed.

According to an embodiment, there is provided a user terminal device including: a display; a communication interface performing communication with an electronic device; and a processor configured to: based on an operation mode of the electronic device being a recording mode, control the display to display a user interface (UI) indicating a recording state for a moving path of the electronic device; based on recording of the moving path being completed, display an interface for moving the electronic device along the moving path; and based on receiving a user command selecting the interface, set the operation mode as a travel mode and transmit a control signal for controlling the electronic device to move along the moving path to the electronic device through the communication interface.

The processor is further configured to: based on the operation mode of the electronic device being in the recording mode, control the display to display an object corresponding to a top view of the object to which the electronic device is attached; and based on receiving a user command for moving the displayed object in one direction, transmit a control signal for controlling the electronic device to move in the one direction, to the electronic device through the communication interface.

The processor is further configured to: control the display to display a plurality of UIs indicating a recording state for a plurality of moving paths of the electronic device; and based on receiving a user command for moving the electronic device along at least one of the plurality of moving paths, transmit a control signal for controlling the electronic device to move along the at least one moving path, to the electronic device through the communication interface.

The communication interface performs communication with a first electronic device and a second electronic device, and the processor is further configured to: control the display to display a first UI indicating a recording state for a first moving path recorded in the first electronic device and a second UI indicating a recording state for a second moving path recorded in the second electronic device; based on receiving a first user command for moving the first electronic device along the first moving path, transmit a first control signal for controlling the first electronic device to move along the first moving path, to the first electronic device through the communication interface; and based on receiving a second user command for moving the second electronic device along the second moving path, transmit a second control signal for controlling the second electronic device to move along the second moving path, to the second electronic device through the communication interface.

The communication interface performs communication with the first electronic device and the second electronic device, and the processor is further configured to: based on an order or a time sequence by which the first moving path and the second moving path are recorded, control the first electronic device and the second electronic device so that the first electronic device and the second electronic device respectively move along the first moving path and the second moving path through the communication interface.

The processor is further configured to: control the display to display a third UI for indicating the recording state for the first moving path of the first electronic device and the recording state for the second moving path of the second electronic device as one record; based on the recordings of the first electronic device and the second electronic device for the first moving path and the second moving path being completed, display an interface for moving the first electronic device and the second electronic device along the first moving path for which the recording is completed and the second moving path for which the recording is completed on the UI; and based on receiving a user command selecting the interface, transmit a first control signal for controlling the first electronic device and a second control signal for controlling the second electronic device to respectively move along the first moving path and the second moving path through the communication interface.

The communication interface performs communication with the first electronic device and the second electronic device, and the processor is further configured to: control the first electronic device and the second electronic device so that the first electronic device and the second electronic device move along a moving path recorded in the first electronic device through the communication interface.

According to an embodiment, there is provided an operating method of an electronic device including a moving part. The method includes: based on the electronic device moving and being in a recording mode, outputting light from a light emitting element; receiving the light reflected from a ground by an optical sensor; acquiring information about a moving path of the electronic device based on the received light; and based on receiving a control signal for moving the electronic device along the moving path from a user terminal device, setting the operation mode of the electronic device as a travel mode, and controlling the moving part so that the electronic device moves along the moving path.

According to an embodiment of the disclosure, if a user records a moving path just once, a fixed-type object can be moved along the recorded moving path.

According to an embodiment of the disclosure, by controlling each of the wheels for recording and for travelling differently according to the recording mode and/or travel mode, damage to the wheels is minimized, and an accurate moving path is ascertainable.

According to an embodiment of the disclosure, a user terminal device provides a visual user interface (UI) that makes storing of a moving path and controlling of an electronic device according to the stored moving path easy.

According to an embodiment of the disclosure, a user terminal device controls moving of one or more electronic devices according to a recorded moving path.

An IoT system including an electronic device and a user terminal device according to some embodiments of the disclosure provides, if a user records a moving path of the electronic device just once, the user can easily manipulate and remotely control movement of the electronic device.

DETAILED DESCRIPTION

Figure 1A:
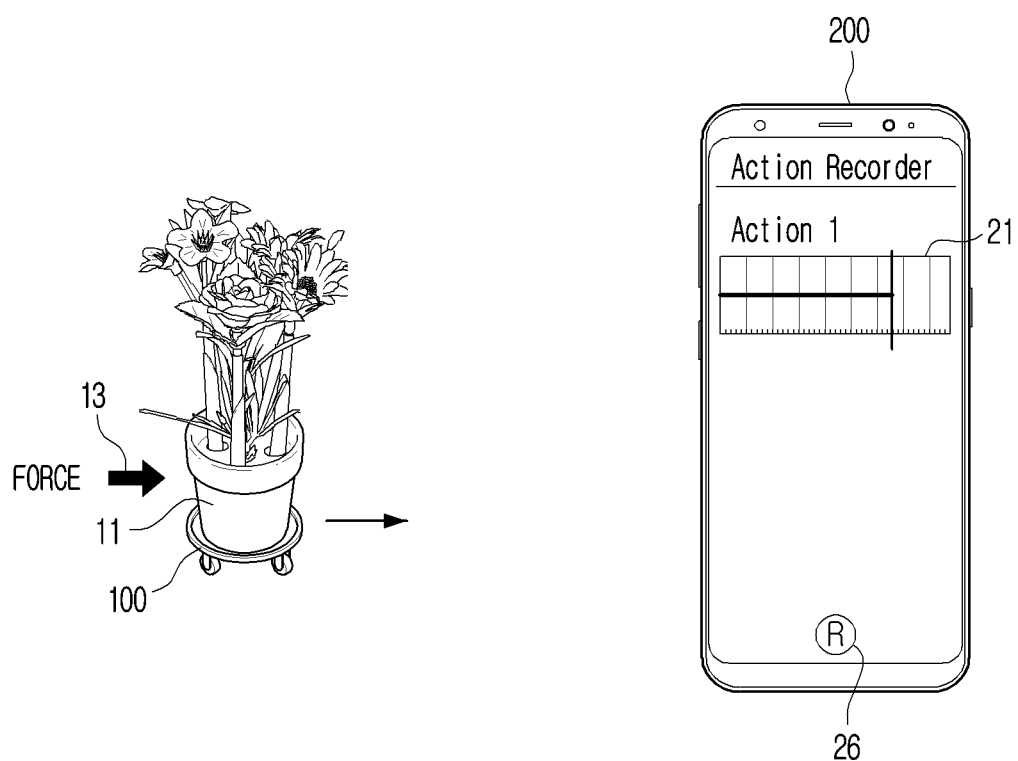
FIG. 1A and FIG. 1B are diagrams schematically illustrating an operation of an electronic device according to the disclosure.

Before describing the disclosure in detail, the description formats of this specification and the drawings will be described.

First, as terms used in this specification and the claims, general terms are selected in consideration of functions in various embodiments of the disclosure. However, the terms may vary depending on the intention of those skilled in the art who work in the pertinent field, legal or technical interpretation, or emergence of new technologies, etc. Also, there may be some terms that are designated by the applicant, and for such terms, the meaning of the terms should be interpreted as defined in this specification, and in case there is no specific definition of the terms, the meaning of the terms may be interpreted based on the overall content of this specification and common technical knowledge in the pertinent technical field.

Further, the same reference numerals or symbols described in the disclosure refer to components or elements performing substantially the same functions. For the convenience of explanation and understanding, the components or elements will be described by using the same reference numerals or symbols in different embodiments. That is, even if components having the same reference numerals are illustrated in the accompanying drawings, the drawings not only include one embodiment, but may include other embodiments.

Also, terms including ordinal numbers such as "the first" and "the second" may be used for distinguishing components. Such ordinal numbers are used for distinguishing the same or similar components from one another, and it is not intended that the meaning of terms is restrictively interpreted due to use of such ordinal numbers. As an example, the order of use or the order of arrangement, etc. of components combined with such ordinal numbers should not be restricted by the numbers. Depending on needs, each ordinal number may be replaced with each other.

In addition, singular expressions may include plural expressions, unless the context indicates otherwise. Further, in the disclosure, terms such as "include" and "consist of" should be construed as designating that there are such characteristics, numbers, steps, operations, elements, components or a combination thereof described in the specification, but not as excluding in advance the existence or possibility of adding one or more of other characteristics, numbers, steps, operations, elements, components or a combination thereof.

Further, in the embodiments of the disclosure, terms such as "a module," "a unit," and "a part" are for referring to elements performing at least one function or operation, and these elements may be implemented as hardware or software, or as a combination of hardware and software. In addition, a plurality of "modules," "units," and "parts" may be integrated into at least one module or chip and implemented as at least one processor, except when each of them needs to be implemented as independent specific hardware.

Also, in the embodiments of the disclosure, the description that a part is connected with another part includes not only a case of direct connection, but also a case of indirect connection through another medium. Further, the description that a part includes an element means that another element may be further included, but not that another element is excluded, unless there is a particular opposing description.

Figure 1B:
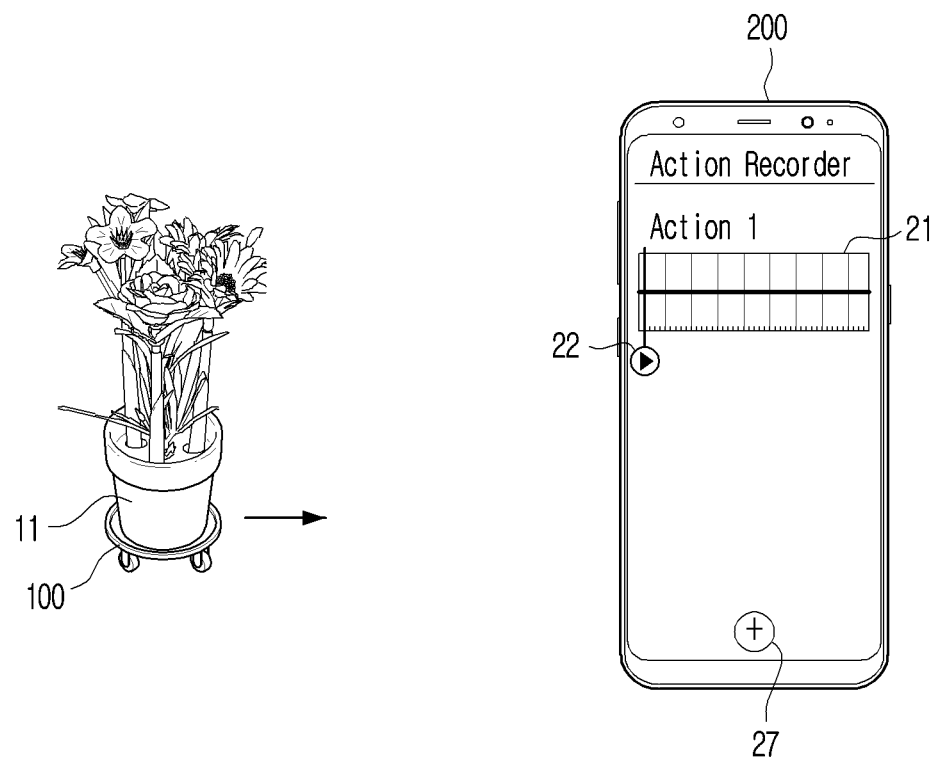

FIG. 1A and FIG. 1B are diagrams schematically illustrating an operation of an electronic device according to the disclosure.

Referring to FIG. 1A, an electronic device 100 including wheels as a moving part may be arranged under a flowerpot 11 and move the flowerpot 11.

Referring to FIG. 1A, a user terminal device 200 performing communication with the electronic device 100 may display a user interface (UI) 21 indicating a recording state of a moving path (e.g., "Action 1") of the electronic device 100. The moving path may be recorded and displayed on a display 26. For example, the display 26 may display the recording state indicating that the moving path of the electronic device 100 is currently in a recording mode when the electronic device 100 is operating in a recording mode.

Referring to FIG. 1A, the electronic device 100 may move the flowerpot 11 by exerting an external force 13, and the electronic device 100 may acquire information about the moving path through a sensor part, and store the information (e.g., record the moving path). Alternatively or additionally, the electronic device 100 may record information about the moving path through the sensor part when an external force 13 is exerted by a user or another object (e.g., pushing or dragging the flowerpot 11).

FIG. 1B illustrates a situation in which the information about the moving path acquired in FIG. 1A is stored in the electronic device 100.

Referring to FIG. 1B, the user terminal device 200 may display a first interface 22 for controlling the electronic device 100 to move along the moving path on which the electronic device 100 moved in FIG. 1A.

If the user selects the first interface 22 in FIG. 1B, a control signal is transmitted from the user terminal device 200 to the electronic device 100, and accordingly, the electronic device 100 may move along the same moving path as the moving path on which it previously moved by the external force 13 in FIG. 1A.

Moreover, referring to FIG. 1B, the user terminal device 200 may display a second interface 27 for recording a new moving path. If the user touches the second interface 27, a new UI for indicating a recording state of a moving path of Action 2, for example, may be displayed.

As described above, if a user inputs simple commands through the user terminal device 200, the electronic device 100 including a moving part may not only record (store) one or more moving paths, but also move by itself according to the recorded moving path.

Hereinafter, components and operations of an electronic device according to the disclosure will be described in more detail technically through the drawings.

Figure 2A:
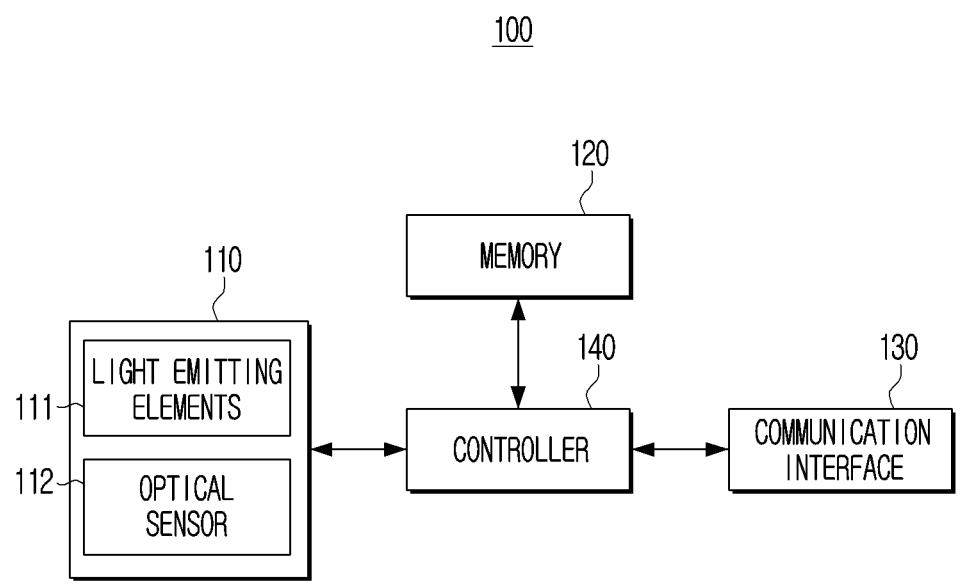
FIG. 2A is a block diagram illustrating a configuration of an electronic device according to an embodiment of the disclosure.

FIG. 2A is a block diagram illustrating an electronic device according to an embodiment of the disclosure.

Referring to FIG. 2A, the electronic device 100 may include a sensor part 110, a memory 120, a communication interface 130, and a controller 140.

The electronic device 100 may include the moving part in various forms, and it may be implemented in a form of being attached to various fixed-type objects such as various home appliances, furniture, etc., and being capable of moving the fixed-type objects. For this, the electronic device 100 may be manufactured in a form that suits a fixed-type object which becomes a subject for moving.

For example, in case a fixed-type object which becomes a subject for moving is a sofa, the electronic device 100 may be implemented in a size and a shape that is capable of being attached to the lower part of the sofa and moving the sofa. As another example, in case a fixed-type object which becomes a subject for moving is a flowerpot, the electronic device 100 may be implemented in a size and a shape capable of being attached to the lower part of the flowerpot and moving the flowerpot. Other than the examples described above, the electronic device 100 may be manufactured in a form that suits various fixed-type objects.

Additionally, it is also possible that a fixed-type object itself is manufactured in a form such as a sofa, a flowerpot, a desk, a chair, etc. to which the electronic device 100 is attached.

According to the embodiments of the disclosure, the electronic device 100 includes a moving part including one or more wheels.

The sensor part 110 is a component for identifying a moving path of the electronic device 100. Referring to FIG. 2A, the sensor part 110 may include one or more light emitting elements 111 and one or more optical sensors 112. A light output through the light emitting elements 111 may be reflected through the ground and received by the optical sensor 112. The controller 140 may acquire an image by using the light received through the optical sensor 112, and identify the moving path of the electronic device 100 by using a change of the acquired image.

Furthermore, the sensor part 110 may include various sensors such as a 3D camera, a LiDAR sensor, or an acceleration sensor, etc. for photographing the surrounding environment for identifying a moving path of the electronic device 100. However, considering the function of the electronic device 100 of needing to move a fixed-type object and an exterior of a fixed-type object to which the electronic device 100 is attached, the electronic device 100 includes wheels, etc. that may be attached to the lower side of a fixed-type object, and it is highly likely that a space between the electronic device 100 and the ground is relatively dark. Accordingly, considering such characteristics of the electronic device 100 and the unit cost of production of the sensor part 110, the light emitting elements and an optical sensor may be included in the sensor part 110 as shown in FIG. 2A.

The memory 120 is a component for storing information about one or more moving paths. The memory 120 may additionally store information about the time (length) that the electronic device 100 moved along a moving path, information about the speed at which the electronic device 100 moved along a moving path, etc. other than information about a moving path. Also, the memory 120 may store information about a name referring to a stored moving path, the time when a moving path was recorded (the recording starting time and the recording completion time), etc.

The memory 120 may be implemented as a non-volatile memory (e.g., a read-only memory (ROM), a hard disc, a solid state drive (SSD), a flash memory), a volatile memory, etc.

The memory 120 may store an operating system (OS) for controlling the overall operations of the components of the electronic device 100 and at least one instruction or data related to the components of the electronic device 100. In this case, the processor included in the controller 140 may control the components of the electronic device 100 by executing the at least one instruction stored in the memory 120.

The communication interface 130 is a component for performing communication with at least one external electronic device and transmitting and receiving signals/data. Also, the communication interface 130 may include a circuit.

The communication interface 130 may include a wireless communication module, a wired communication module, a broadcast receiving module, etc.

A wireless communication module may include at least one of a Wi-Fi communication module, a Bluetooth module, an infrared data association (IrDA) module, a 3rd generation (3G) mobile communication module, a 4th generation (4G) mobile communication module, a 4th generation Long Term Evolution (LTE) communication module, or a 5th generation (5G) mobile communication module for receiving signals/data from an external server or an external device.

A wired communication module may include an interface module such as a universal serial bus (USB), and it may be physically connected with an external terminal device such as a PC through such an interface module, and transmit and receive voice or image data, or transmit and receive firmware data for performing firmware upgrade.

Also, a wired communication module may be implemented as a wired port such as an high-definition multimedia interface (HDMI) port, a display port, an RGB port, a digital visual interface (DVI) port, a Thunderbolt, a component port, etc.

The controller 140 is a component for controlling overall operations of the electronic device 100. The controller 140 may include circuit, and it may include one or more processors implemented as a central processing unit (CPU), a graphical processing unit (GPU), a network processing unit (NPU), etc.

Figure 2B:
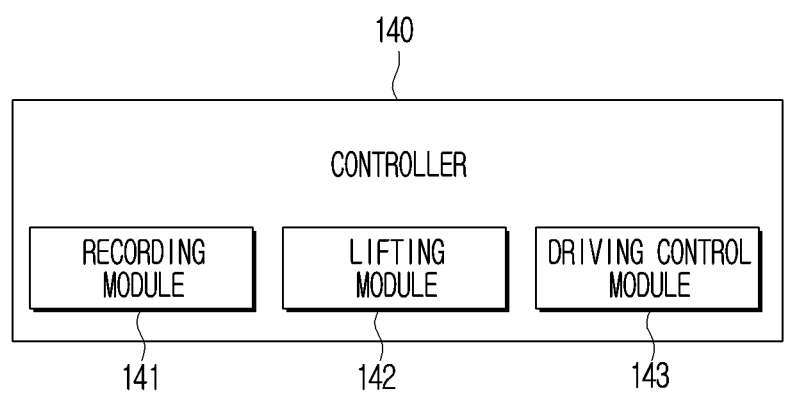
FIG. 2B is a block diagram illustrating a configuration of a controller included in an electronic device according to an embodiment of the disclosure.

FIG. 2B is a block diagram illustrating a configuration of a controller included in an electronic device according to an embodiment of the disclosure. Referring to FIG. 2B, the controller 140 may include at least one of a recording module 141, a lifting module 142, or a driving control module 143.

At least one of the modules illustrated through FIG. 2B may be implemented in a form of a circuit which is hardware, or implemented in a form of software which is stored in the memory 120 and can be executed by the processor inside the controller 140. Also, at least one of the modules illustrated through FIG. 2B may be implemented in a form of including both of hardware and software.

The components of the controller 140 do not necessarily need to be identical to those of FIG. 2B, but for the convenience of explanation, the operation of the controller 140 will be explained by using the modules illustrated in FIG. 2B.

The controller 140 may set the operation mode of the electronic device 100 to a recording mode. Specifically, the controller 140 may change the operation mode of the electronic device 100 from a stand-by mode to a recording mode. The recording mode is a mode for storing information about a moving path (e.g., recording a moving path) of the electronic device 100.

The controller 140 may set the operation mode of the electronic device 100 to the recording mode by pushing a button or touching an interface on a touch pad provided on the electronic device 100.

Alternatively or additionally, if a control signal for setting of the recording mode is received from a user terminal device connected through the communication interface 130, the controller 140 may set the operation mode of the electronic device 100 to the recording mode. Specifically, as a result of a user command for starting the recording mode being input into the user terminal device, the control signal may be transmitted from the user terminal device to the electronic device 100. Here, a user command for the user terminal device may be input in various forms (e.g., a touch, a voice, a motion, a push of a button, etc.).

The controller 140 may acquire information about a moving path of the electronic device 100 by using the sensor part 110 in a state in which the operation mode of the electronic device 100 is the recording mode.

Specifically, while the electronic device 100 is moving, the controller 140 may output a light by using the light emitting elements 111, and when the output light is reflected from the ground and received by the optical sensor 110, the controller 140 may acquire information about the moving path of the electronic device based on the received light, and store the information in the memory 120.

The controller 140 may acquire images by using the received light through the recording module 141, and if the acquired images change as the electronic device 100 moves, the controller 140 may identify and record the moving path of the electronic device 100 by using the change of the images.

Here, the controller 140 may compare patterns commonly included in images or locations where subjects are included in images, and also identify and record the moving distance or the moving speed of the electronic device 100.

When the electronic device 100 is moving, the controller 140 may identify the direction in which the wheels included in the moving part rotate, the number of rotations, the rotating speed, etc., and identify the moving path and the moving speed, etc. of the electronic device 100.

The controller 140 may change the operation mode of the electronic device 100 from the recording mode to the stand-by mode.

Specifically, as a button or a touch pad provided on the electronic device 100 is pushed or touched by a user, the controller 140 may identify that recording for a moving path is finished, and end identification of the moving path, and at the same time, change the operation mode of the electronic device 100 from the recording mode to the stand-by mode.

Alternatively or additionally, if a control signal for ending the recording mode is received from a user terminal device connected through the communication interface 130, the controller 140 may end the recording mode, and set the operation mode of the electronic device 100 to the stand-by mode. Specifically, as a result of a user command for ending the recording mode being input into the user terminal device, the control signal may be transmitted from the user terminal device to the electronic device 100. Here, a user command for the user terminal device may be input in various forms (e.g., a touch, a voice, a motion, a push of a button, etc.).

Also, if a control signal for moving the electronic device 100 along the (recorded) moving path is received from the user terminal device through the communication interface 130, the controller 140 may set the operation mode of the electronic device 100 to the travel mode, and control the moving part so that the electronic device 100 moves along the moving path. That is, the controller 140 may change the operation mode from the stand-by mode to the travel mode according to the received control signal.

In this case, the controller 140 may control the moving part through the driving control module 143 that can control one or more actuators for transmitting a driving force to the wheels inside the moving part.

In case moving along the recorded moving path is completed, the controller 140 may change the operation mode from the travel mode to the stand-by mode again.

A moving part may include one or more wheels. Specifically, the moving part may include a wheel for recording and/or a wheel for travelling.

A wheel for recording is a component for making the electronic device 100 move in a state in which the electronic device 100 is in the recording mode, and a wheel for travelling is a component for the controller 140 to actively move the electronic device 100 in a state in which the electronic device 100 is in the travel mode, which will be explained in detail later.

Figure 3A:
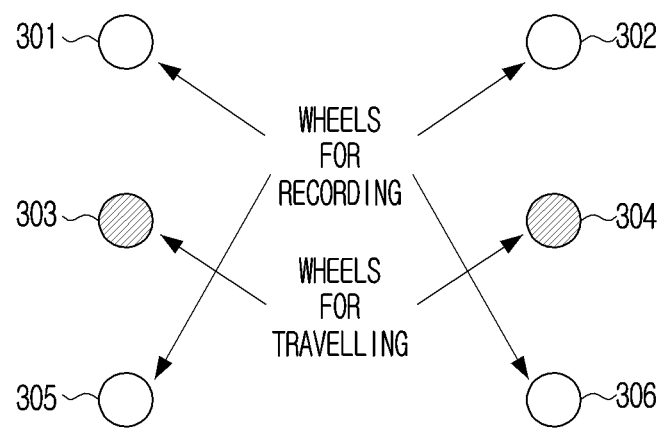
FIG. 3A to FIG. 3C are diagrams illustrating various examples of moving part of an electronic device including a wheel for recording and/or a wheel for travelling, according to embodiments of the disclosure.
Figure 3B:
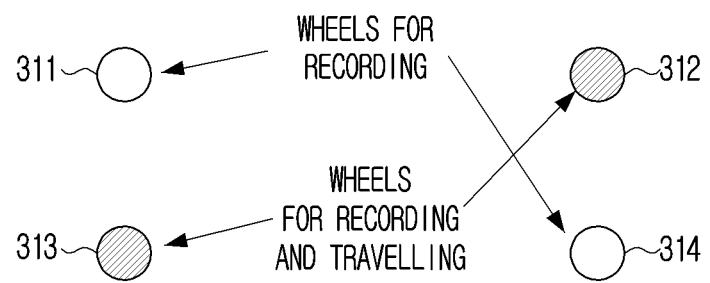
Figure 3C:
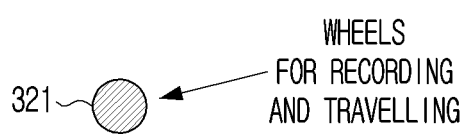

FIG. 3A to FIG. 3C are diagrams illustrating various examples of a moving part of an electronic device including a wheel for recording and/or a wheel for travelling, and are diagrams for indicating arrangements and characteristics of one or more wheels included in the moving part.

Referring to FIG. 3A, the moving part of the electronic device 100 may separately include four wheels for recording 301, 302, 305, 306 and two wheels for travelling 303, 304. However, the number of wheels for recording and wheels for travelling are not limited thereto, and may include more or less wheels according to various embodiments.

As an example, wheels for recording and wheels for travelling are separately included as provided in FIG. 3A. When the operation mode of the electronic device 100 is the recording mode, the wheels for recording may rotate according to an external force applied to the electronic device 100, and thereby, moving the electronic device 100. While the electronic device 100 is moving, the controller 140 may acquire information about the moving path of the electronic device 100 based on the received light, and store the information in the memory 120.

The controller 140 may control the wheels for recording and the wheels for travelling to be separated from the ground in a state wherein the operation mode of the electronic device 100 is the stand-by mode, and when the operation mode of the electronic device 100 is changed from the stand-by mode to the recording mode, the controller 140 may control the wheels for recording and the wheels for travelling to descend in the direction of the ground.

When a control signal for moving the electronic device 100 along the stored moving path is received from a user terminal device through the communication interface 130, the controller 140 may set the operation mode of the electronic device 100 to the travel mode, and control the wheels for travelling through the driving control module 143 so that the electronic device 100 moves along the moving path.

Here, when the operation mode of the electronic device 100 is changed from the stand-by mode to the travel mode, the controller 140 may control the wheels for recording and the wheels for travelling to descend in the direction toward the ground by using the lifting module 142.

In this regard, the wheels for recording may be attached to the electronic device 100 through a suspension, and the wheels for travelling may be attached to the electronic device 100 without a suspension. The suspension may be implemented by a strut method, a wishbone method, a multi-type method, etc.

In case all of the wheels for recording and the wheels for travelling descended in the travel mode, the wheels for travelling without a suspension may be in contact with the ground and may be driven more robustly than the wheels for recording with a suspension. Thus, the wheels for travelling can move the electronic device 100 and the object to which the electronic device 100 is attached more effectively according to the driving force transmitted to the wheels for travelling through the driving control module 143.

As described above, the controller 140 may control the ascending/descending of the respective wheels for recording and wheels for travelling by using the lifting module 142. A detailed description relating to the ascending/descending of the wheels will be described later through FIG. 4 and FIG. 5.

Referring to FIG. 3B, a moving part may include wheels for recording 311, 314 and wheels for recording and travelling 312, 313. In this case, in both of the recording mode and the travel mode, the controller 140 may make all of the wheels for recording 311, 314 and the wheels for travelling 312, 313 descend in the direction toward the ground.

Here, when the electronic device 100 is moving as the wheels for recording and the wheels for travelling rotate according to an external force applied to the electronic device 100 in a state wherein the operation mode of the electronic device 100 is the recording mode, the controller 140 may acquire information about the moving path of the electronic device 100 based on the received light and store the information in the memory 120, and if a control signal is received from a user terminal device through the communication interface 130, the controller 140 may set the operation mode of the electronic device 100 to the travel mode, and control the wheels for travelling so that the electronic device 100 moves along the moving path.

Referring to FIG. 3C, a moving part may include only one or more wheels 321 for recording and travelling. In this case, in the recording mode and the travel mode, the controller 140 may also control the wheels 321 to descend in the direction of the ground.

Figure 4:
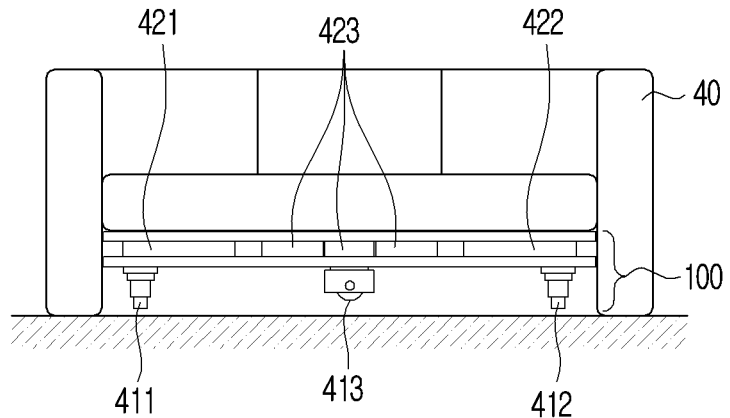
FIG. 4 is a diagram illustrating an example of an electronic device controlling ascending/descending of each of a wheel for recording and a wheel for travelling for each mode, according to an embodiment of the disclosure.
Figure 4:
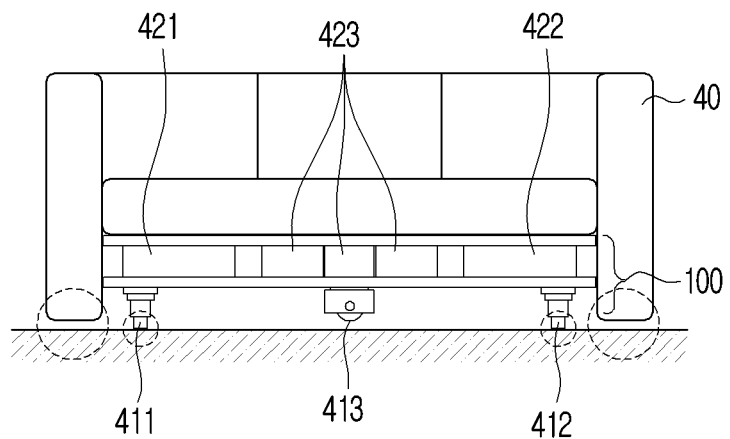
Figure 4:
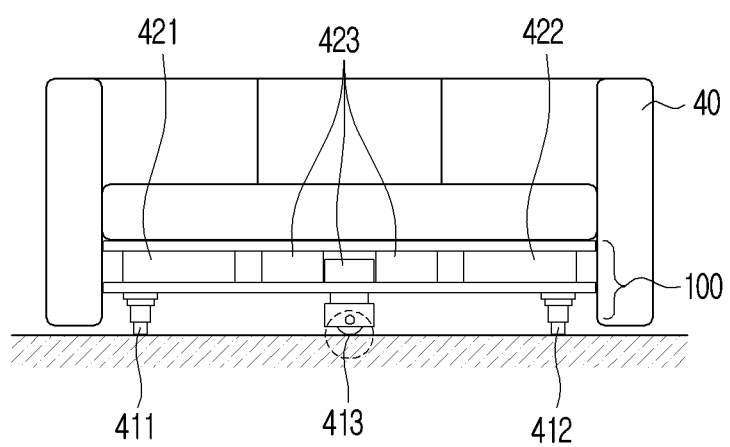

FIG. 4 is a diagram illustrating an example of an electronic device controlling ascending/descending of each of a wheel for recording and a wheel for travelling for each mode.

FIG. 4 assumes that the electronic device 100 is manufactured and implemented to be attached to the lower part of the sofa 40, and it relates to a case in which the moving part of the electronic device 100 includes wheels for recording and wheels for travelling separately as shown in FIG. 3A.

Referring to FIG. 4, the electronic device 100 includes wheels for recording 411, 412 and a wheel for travelling 413. Also, the electronic device 100 may include lifting members 421, 422 and 423 for respectively making the aforementioned wheels ascend/descend. The lifting members 421, 422 and 423 may be controlled by the lifting module 142 of the controller 140.

Referring to the stand-by mode in FIG. 4, the controller 140 may control all of the wheels for recording 411, 412 and the wheel for recording 413 maintain a state of being separated from the ground (or not in contact with the ground) and being in an ascended state.

Referring to the recording mode in FIG. 4, by controlling the lifting members 421, 422, the controller 140 may control the wheels for recording 411, 412 descend in the direction of the ground and contact the ground. As a result, while the wheels for recording 411 and 412 are in contact with the ground, the sofa 40 is slightly elevated from the ground. Here, in case the sofa 40 is pushed to any one direction by an external force (e.g., in case the user pushes the sofa 40), the sofa 40 moves as the wheels for recording 411, 412 of the electronic device 100 rotate.

Referring to the travel mode in FIG. 4, by controlling the lifting members 421, 422 and 423, the controller 140 may not only control the wheels for recording 411, 412 but also the wheel for travelling 413 to descend in the direction of the ground and contact the ground. As a result, when the wheels 411, 412 and 413 are in contact with the ground, the sofa 40 is slightly elevated from the ground. Here, the controller 140 may transmit a driving force to the wheel for travelling 413 according to a control signal received from a user terminal device, and as the wheels for recording 411 and 412 also rotate together by the rotating power of the wheel for travelling 413 by the driving force, the sofa 40 may move.

Figure 5:
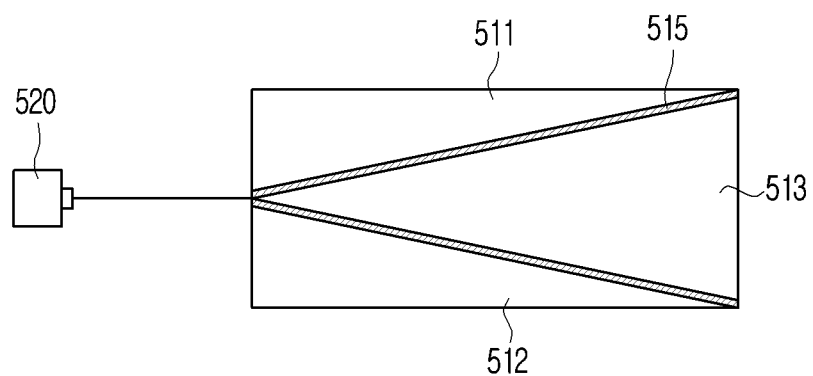
FIG. 5 is a diagram illustrating an example of a lifting method of lifting members included in FIG. 4, according to an embodiment of the disclosure.
Figure 5:
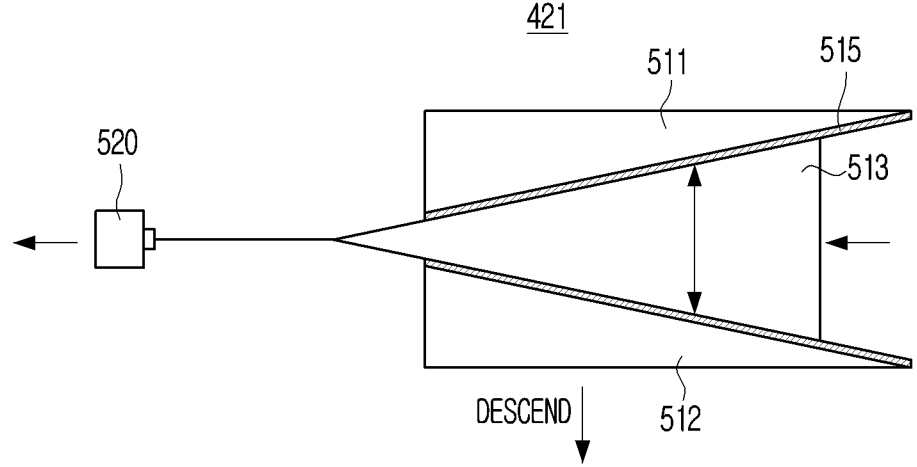

FIG. 5 is a diagram for illustrating an example of a lifting method of lifting members included in FIG. 4. FIG. 5 provides one of the related arts as an example as means for implementing the internal components of the lifting members 421, 422 and 423, and it is obvious that various conventional lifting technologies for controlling wheels to ascend/descend can be used.

Referring to FIG. 5, the lifting member 421 may include an upper part 511, a lower part 512, a moving part 513, a guide part 515, and a pulling part 520, etc., as an example.

Here, if it is assumed that the lifting member 421 is located between the body (excluding the wheels) and the wheels of the electronic device 100, the upper part 511 is attached to the side of the body of the electronic device 100, and the lower part 512 is attached to the side of the wheel 411. The guide part 515 may be implemented as a ball bearing, etc.

Referring to the lower part of FIG. 5, in case the operation mode of the electronic device 100 is set to the recording mode or the travel mode, the pulling part 520 may move in one direction according to control by the lifting module 142. Here, the moving part 513 connected with the pulling part 520 may also get to move in the direction, and as a result, the lower part 512 to which the wheel 411 is attached descends, and the wheel 411 may descend in the direction of the ground.

FIG. 6A to FIG. 6F are diagrams for illustrating operations of an electronic device for storing a moving path according to a result of moving by an external force, and moving along the stored moving path. FIG. 6A to FIG. 6F assume a case in which the electronic device 100 is manufactured and implemented to move the flowerpot 61.

Figure 6A:
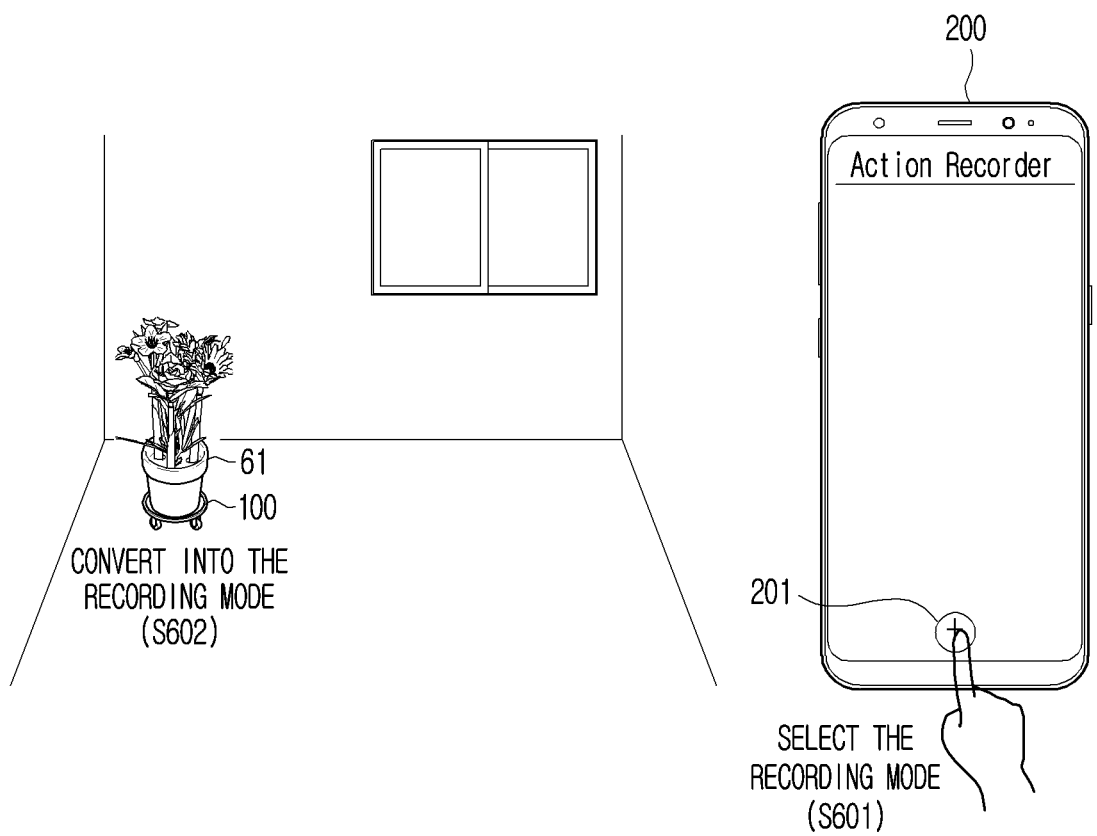
FIG. 6A to FIG. 6F are diagrams illustrating operations of an electronic device for storing a moving path according to a result of moving by an external force, and moving along the stored moving path, according to an embodiment of the disclosure.

Referring to FIG. 6A, the user terminal device 200 (e.g., a smartphone) connected with the communication interface 130 of the electronic device 100 may display an interface 201 for recording a new moving path.

Here, if a user selects the interface 201 in operation S601, the user terminal device 200 may transmit a control signal for controlling the electronic device 100 to set the operation mode to the recording mode, e.g., to start recording a moving path to the electronic device 100.

As a result, the electronic device 100 may convert the operation mode into the recording mode, and at the same time, start recording in operation S602.

Figure 6B:
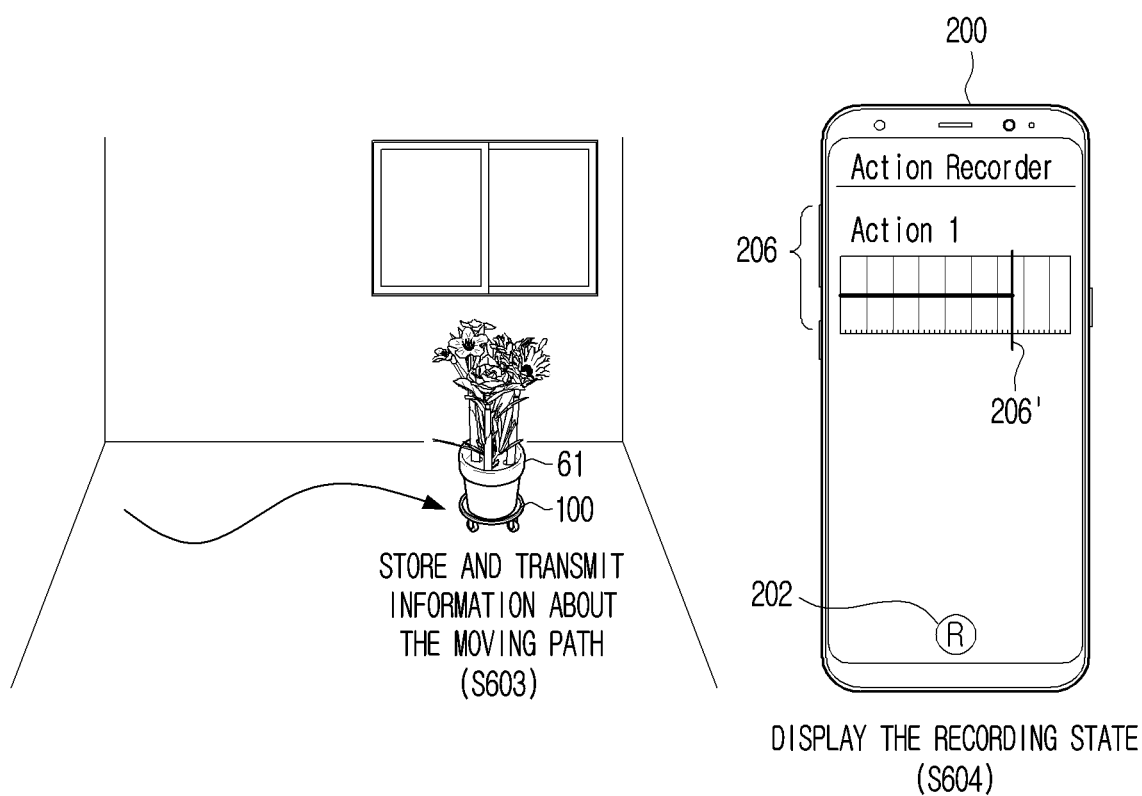

Referring to FIG. 6B, while the flowerpot 61 and the electronic device 100 are moving by an external force, etc., the electronic device 100 may acquire information about the moving path and store the information, and at the same time, transmit information about the moving path to the user terminal device 200 in operation S603. Here, the electronic device 100 may transmit information notifying starting/ending times, when the recording of the moving path starts/ends, to the user terminal device 200. Alternatively, the electronic device 100 may not transmit the information about the moving path to the user terminal device 200.

Referring to FIG. 6B, while the recording about the moving path of the electronic device 100 is being performed, the user terminal device 200 may display a UI 206 indicating the recording state for the moving path in operation S604. Specifically, the user terminal device 200 may control the bar 206' to move to the right side on the UI 206 from the time when the recording about the moving path starts to the time when the recording is finished.

The UI 206 may display information about a time period for which a moving path is recorded through the horizontal axis, and although not illustrated in FIG. 6B, the user terminal device 200 may receive a moving path itself from the electronic device 100 and display the moving path directly.

Here, the time point when recording about a moving path starts and the time point when the recording ends are displayed on the UI 206 may be designated as the time points when a user command (start/end of recording) is input into the user terminal device 200. Alternatively, the time points may be designated as the time points when a signal notifying starting/ending of recording of a moving path was received by the user terminal device 200 from the electronic device 100.

Referring to FIG. 6B, the user terminal device 200 may display an interface 202 for ending the recording mode that is in progress.

Figure 6C:
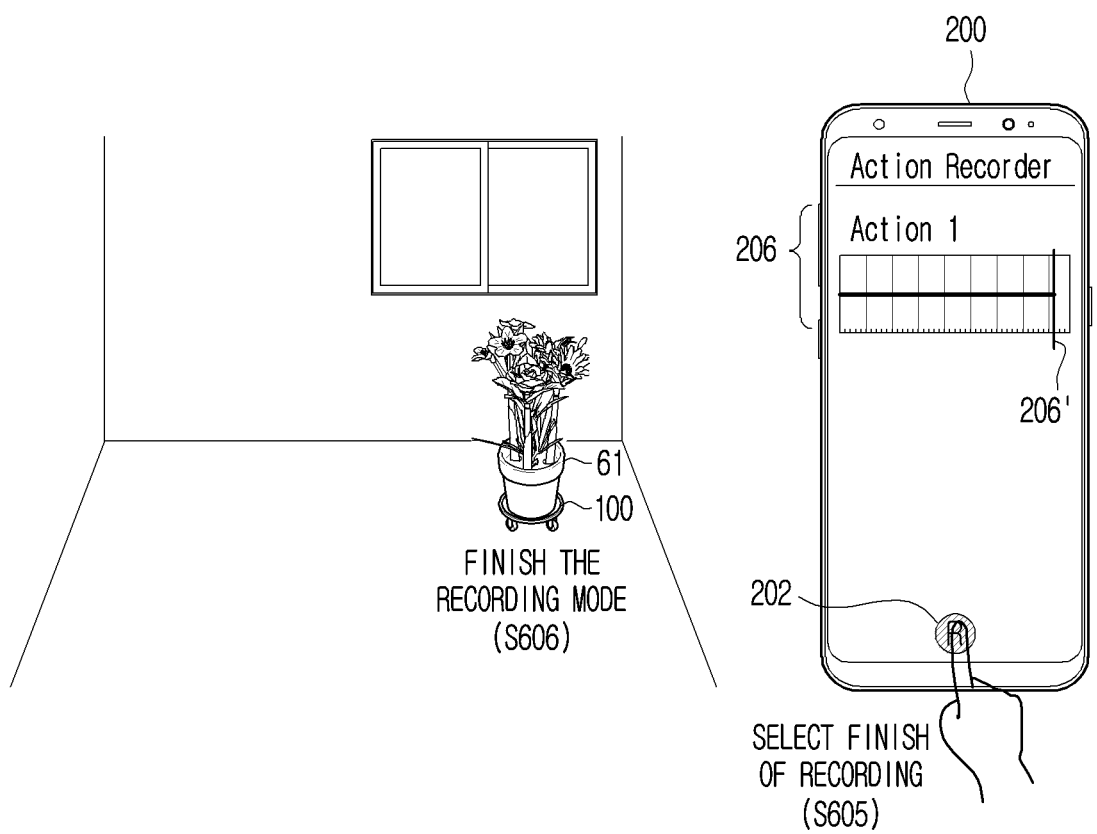

Referring to FIG. 6C, the user may finish the recording by selecting the interface 202 in operation S605. In this case, the user terminal device 200 may transmit a control signal for the finishing of the recording mode (the finishing the recording) to the electronic device 100. As a result, the electronic device 100 may finish the recording mode in operation S606.

Figure 6D:
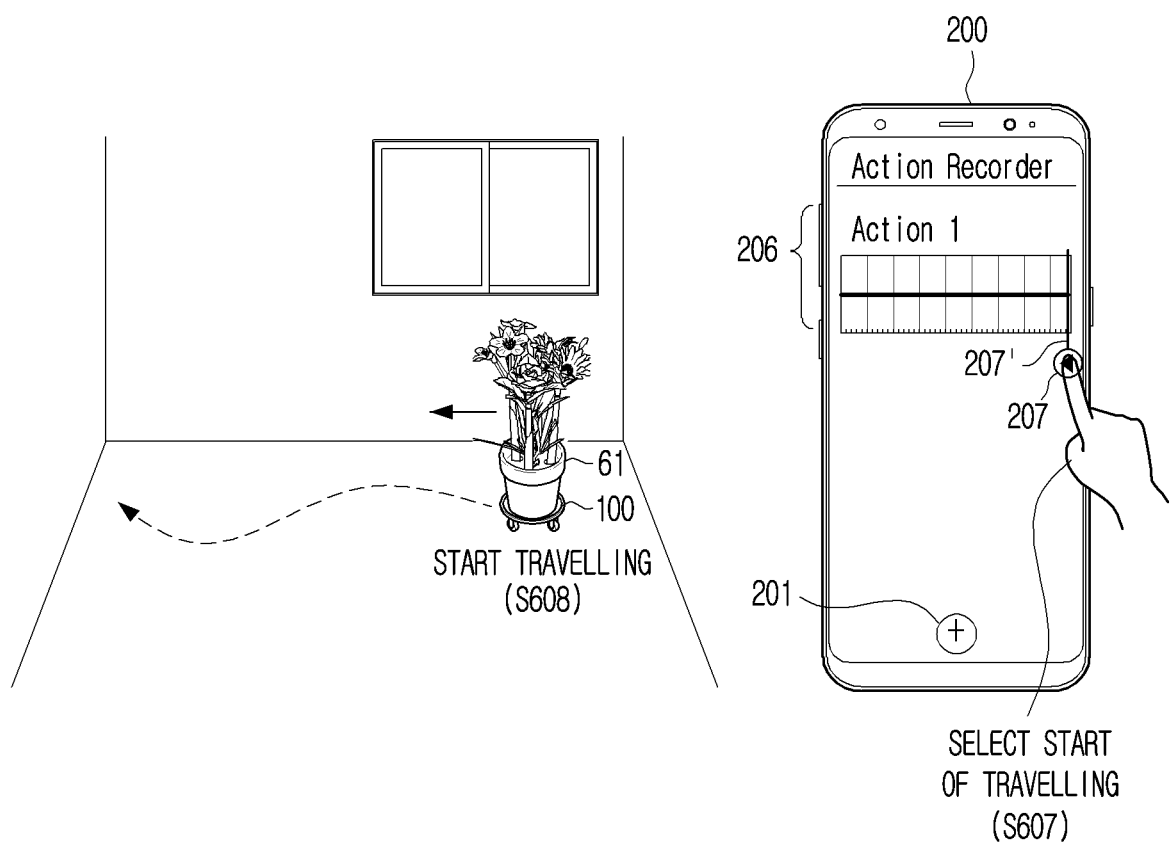

In this case, referring to FIG. 6D, the user terminal device 200 may display an interface 207 and a bar 207' for moving the electronic device 100 along the recorded moving path (Action 1). If the user selects the interface 207 for starting travelling in operation S607, the user terminal device 200 may transmit a control signal for moving along the recorded moving path (Action 1) to the electronic device 100.

As a result, the electronic device 100 may start travelling along the moving path (Action 1) in operation S608 (the travel mode). In this case, as the interface 207 pointing to the left side is selected while the bar 207' is on the rightmost side of the UI 206, the bar 207' may be relocated to the left side of the UI 206, and the electronic device 100 also may move in a reverse direction of the recorded moving path according to the location of the bar 207'. That is, the electronic device 100 may return to a previous position along the moving path that the electronic device 100 recorded in the recording mode.

Figure 6E:
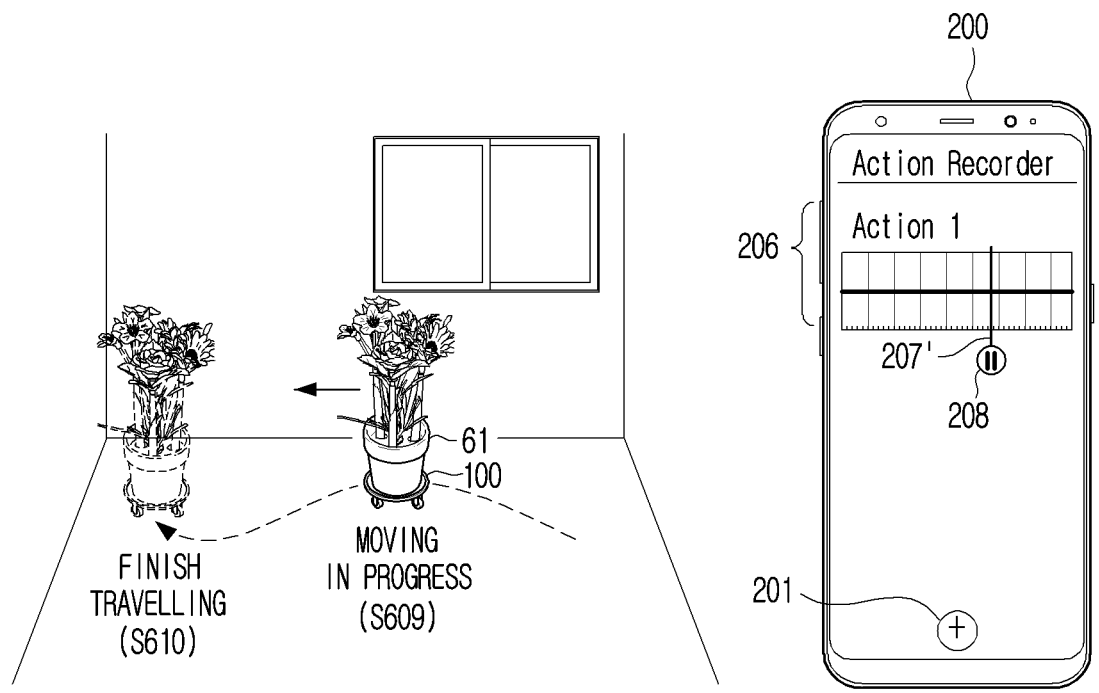

Referring to FIG. 6E, while the travelling of the electronic device 100 is in progress in operation S609, the shape of the interface 207 may be changed to an interface 208 for selecting temporary pause. If the user selects the interface 208, the bar 207' stops, and the electronic device 100 also gets to stop travelling.

Referring to FIG. 6E, in case the electronic device 100 arrived at the point where it initially departed along the recorded moving path, the electronic device 100 stops travelling and is converted to the stand-by mode in operation S610. Here, referring to FIG. 6F, the bar 207' gets to be in a state of having moved to the leftmost side of the UI 206.

Figure 6F:
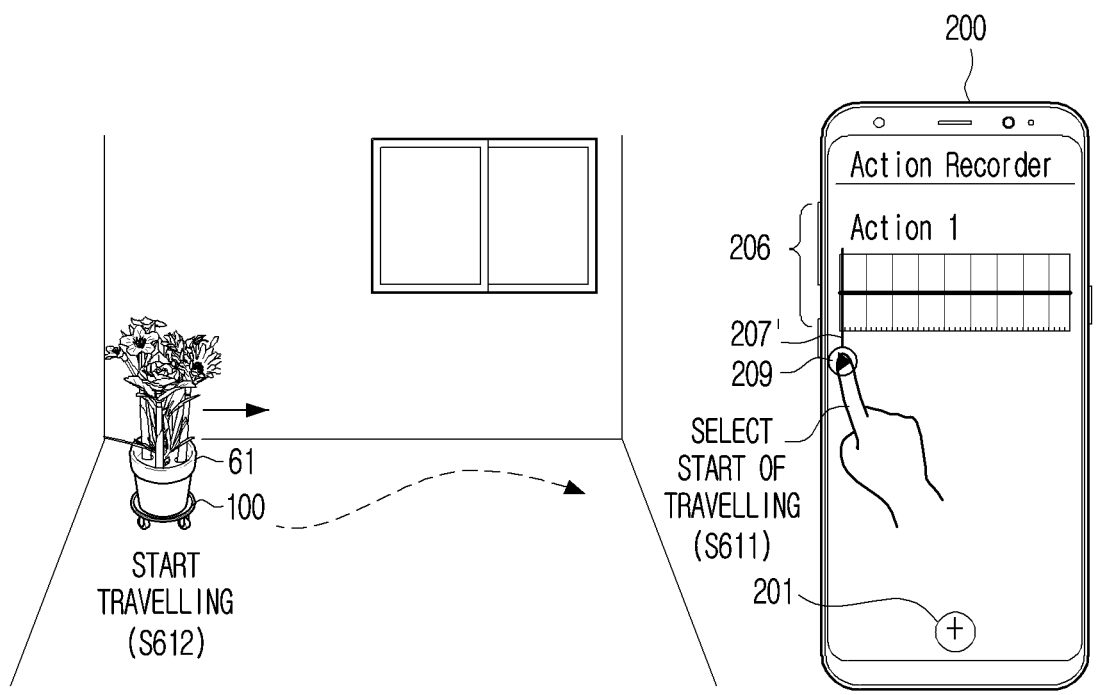

Referring to FIG. 6F, the shape of the interface 208 for selecting temporary pause gets to change to an interface 209 for resuming travelling as travelling is finished. Here, if the user selects the interface 209 in operation S611, the electronic device 100 receives a control signal from the user terminal device 200 and gets to start travelling along the moving path (Action 1) in operation S612.

When the user does not select the interface 209, but selects the interface 201 in a state wherein the electronic device 100 is in the stand-by mode, the electronic device 100 enters the recording mode again, and records another moving path (e.g., Action 2).

It is not impossible that the interface 201 is selected and the recording mode of the another moving path (ex. Action 2) proceeds while the electronic device 100 is travelling as a result of the interface 209 being selected. In this case, travelling according to Action 1 and recording for Action 2 may proceed simultaneously.

Moreover, the controller 140 does not necessarily move by an external force in the recording mode.

As an example, if a control signal based on a user command for moving the electronic device 100 is received from a user terminal device through the communication interface 130 in a state wherein the operation mode of the electronic device 100 is the recording mode, the controller 140 may control the moving part so that the electronic device 100 moves according to the received control signal.

In this case, as the electronic device 100 can move without an external force only if the wheel for travelling contacts the ground in the recording mode, even when a wheel for recording and a wheel for travelling are separately included in the moving part, the controller 140 may control the wheel for recording and the wheel for travelling so that both of them descend in the direction of the ground in the recording mode.

The controller 140 may acquire information about the moving path of the electronic device 100 based on the received light and store the information in the memory 120.

According to this embodiment, the electronic device 100 moves by control by the user terminal device in the recording mode and relates to the embodiments shown in FIG. 8A and FIG. 8B that will be described below.

The controller 140 may acquire information about a plurality of moving paths in a state wherein the operation mode of the electronic device 100 is the recording mode, and store the information in the memory. Specifically, the controller 140 may record one moving path whenever starting and finishing of the recording mode are repeated.

In this case, the controller 140 may control the moving part so that the electronic device 100 moves along a moving path corresponding to the received control signal among the plurality of moving paths.

The controller 140 may record not only a moving path, but also a moving speed of the electronic device 100 while it moves to the moving path.

Specifically, the controller 140 may acquire information about a moving path and a moving speed of the electronic device 100 and store the information in the memory 120 in the recording mode. Then, if a control signal for moving the electronic device 100 along the stored moving path is received from a user terminal device through the communication interface 130, the controller 140 may set the operation mode of the electronic device 100 to the travel mode, and control the moving part so that the electronic device 100 moves according to the stored moving path and moving speed.

Through FIG. 7 to FIG. 12 below, additional embodiments related to the aforementioned components of the user terminal device and the user terminal device will be explained.

Figure 7:
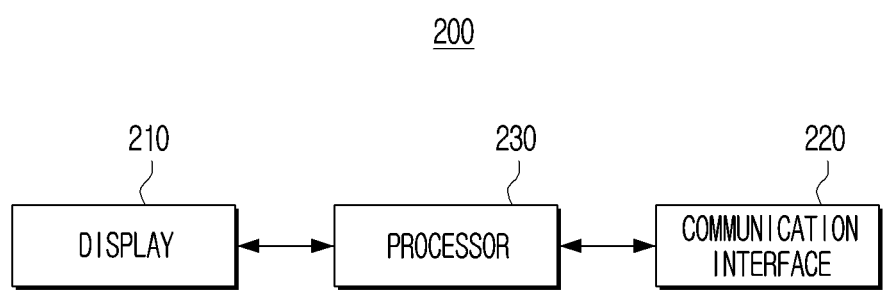
FIG. 7 is a block diagram illustrating a configuration of a user terminal device according to an embodiment of the disclosure.

FIG. 7 is a block diagram for illustrating a configuration of a user terminal device according to an embodiment of the disclosure.

Referring to FIG. 7, the user terminal device 200 may include a display 210, a communication interface 220, a processor 230, etc. The user terminal device 200 may be implemented as various terminal devices such as a smartphone, a tablet PC, a laptop PC, a desktop PC, a TV, a smart speaker, etc.

The display 210 is a component for displaying one or more images or a graphic UI, etc., and it may be implemented as a liquid crystal display (LCD), a plasma display panel (PDP), organic light emitting diodes (OLED), transparent OLED (TOLED), micro LED, etc.

The display 210 may be implemented in a form of a touch screen that can detect a touch manipulation of a user, and it may also be implemented as a flexible display that can be folded or bent.

The communication interface 220 is a component for the user terminal device 200 to perform communication with at least one external electronic device and transmit and receive signals/data. For this, the communication interface 220 may include a circuit. The communication interface 220 may perform communication with the electronic device 100.

The communication interface 220 may include a wireless communication module, a wired communication module, a broadcast receiving module, etc.

A wireless communication module may include at least one of a Wi-Fi communication module, a Bluetooth module, an infrared data association (IrDA) module, a 3rd generation (3G) mobile communication module, a 4th generation (4G) mobile communication module, a 4th generation Long Term Evolution (LTE) communication module, or a 5th generation (5G) mobile communication module for receiving signals/data from an external server or an external device.

A wired communication module may include an interface module such as a USB, and it may be physically connected with an external terminal device such as a PC through such an interface module, and transmit and receive voice or image data, or transmit and receive firmware data for performing firmware upgrade.

Also, a wired communication module may be implemented as a wired port such as an HDMI port, a display port, an RGB port, a digital visual interface (DVI) port, a Thunderbolt, a component port, etc.

The processor 230 is connected with the aforementioned display 210 and communication interface 220, and controls the overall operations of the user terminal device 200.

For this, the processor 230 may be implemented as a CPU, a GPU, an NPU, etc., and it may perform operations or data processing regarding control of other components included in the electronic device 100.

The processor 230 according to an embodiment of the disclosure may, while the operation mode of the electronic device 100 is the recording mode, control the display 210 to display a user interface (UI) indicating the recording state for the moving path of the electronic device 100.

Then, when the recording of the electronic device 100 about the moving path is completed, the processor 230 may display an interface for moving the electronic device 100 along the moving path for which the recording was completed on the UI.

Here, if a user command selects the interface for moving the electronic device 100 along the recorded moving path, the processor 230 may set the operation mode to the travel mode through the communication interface 220, and transmit a control signal for controlling the electronic device 100 to move along the moving path for which the recording was completed to the electronic device 100.

When the operation mode of the electronic device 100 is the recording mode, the processor 230 may control the display 210 to display an object corresponding to a top view of an object to which the electronic device 100 is attached.

When a user command for moving the displayed object to one direction is received, the processor 230 may transmit a control signal for controlling the electronic device 100 to move to a direction corresponding to the one direction to the electronic device 100 through the communication interface 220.

Figure 8A:
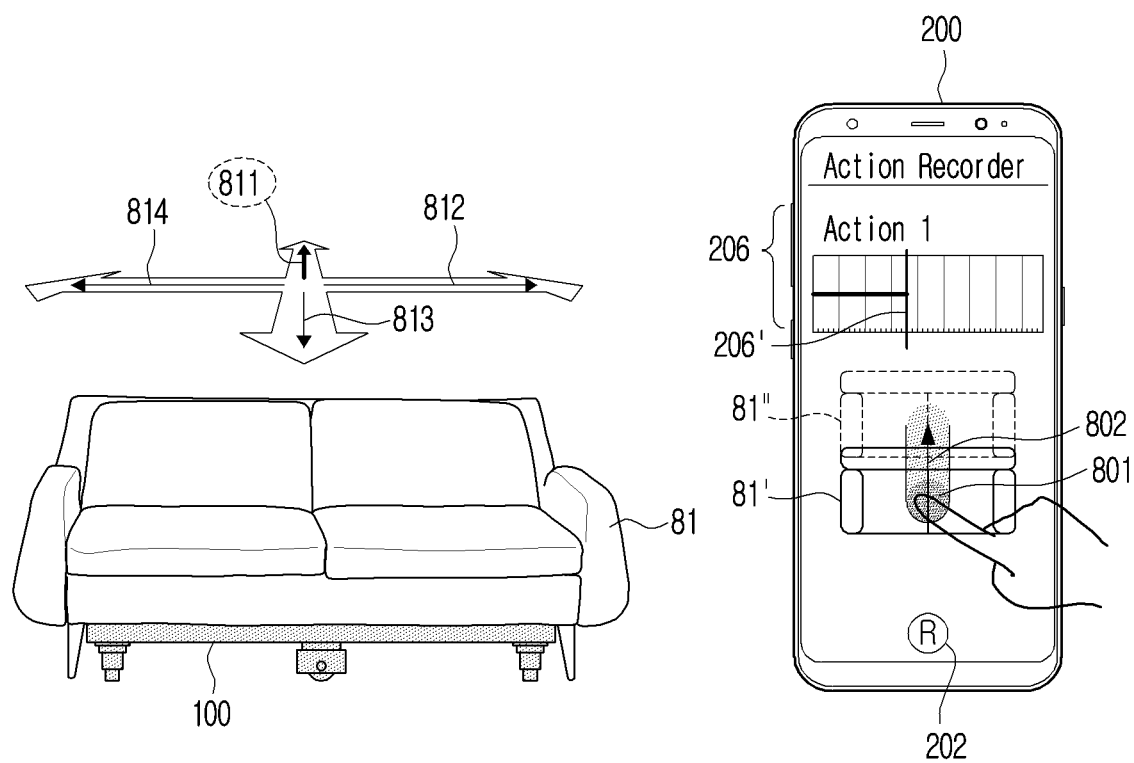
FIG. 8A and FIG. 8B are diagrams respectively illustrating a user interface (UI) of a user terminal device for moving an electronic device in a recording mode and operation examples of an electronic device that moves according to control by the user terminal device, according to embodiment of the disclosure.
Figure 8B:
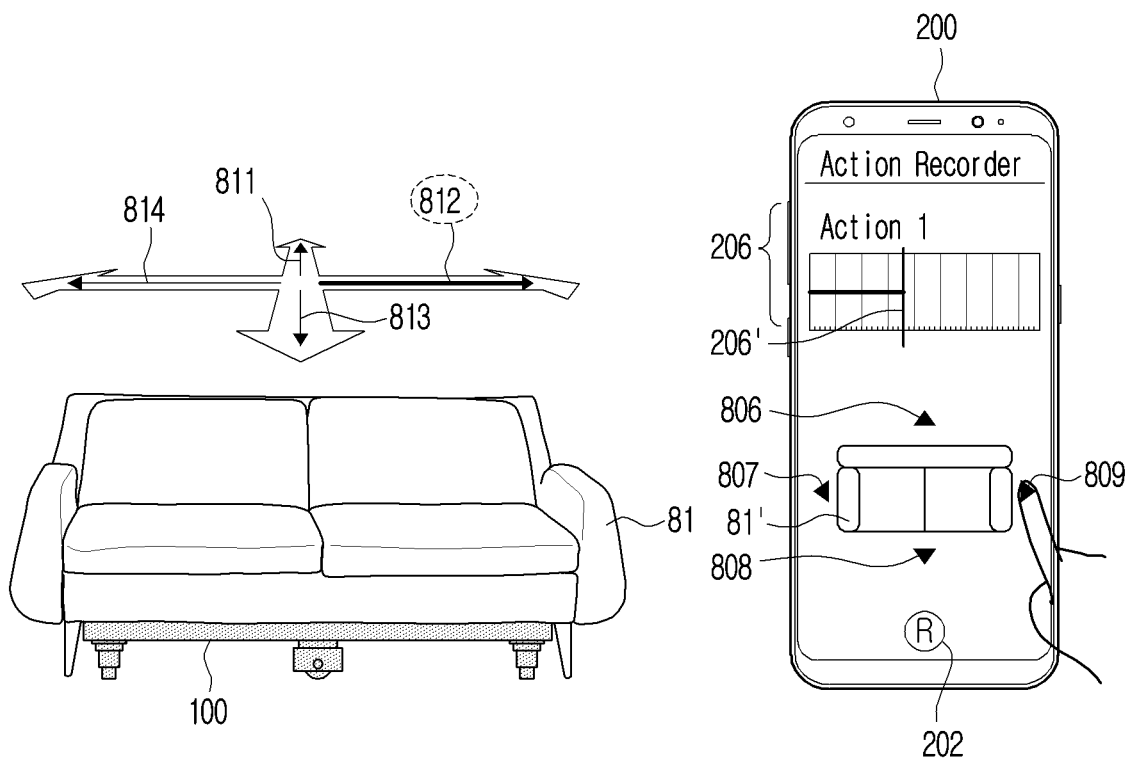

In this regard, FIG. 8A and FIG. 8B are diagrams for respectively illustrating a UI of a user terminal device for moving an electronic device in a recording mode and operation examples of an electronic device that moves according to control by the user terminal device.

First, referring to FIG. 8A, in a state wherein the electronic device 100 is in the recording mode, the user terminal device 200 may display an object 81' matched to the top view of the sofa 81 to which the electronic device 100 is attached. Here, if a touch that drags the area 801 where the object 81' is displayed to the upper direction 802, the user terminal device 200 may display a derivative object 81" for showing the appearance of the object 81' when moving in the drag direction.

The user terminal device 200 may transmit a control signal for moving to the direction 811 corresponding to the direction 802 which is the drag direction to the electronic device 100. Then, the electronic device 100 may control the moving part so that the sofa 81 moves to the direction 811.

In this case, the user terminal device 200 may display the object 81' corresponding to the top view of the sofa 81, and thereby make a user intuitively predict a direction in which the sofa 81 will move according to the user's manipulation (e.g., user's touch operation on a touch screen) in the user terminal device 200. That is, regardless of in which direction the user holding the user terminal device 200 is standing based on the sofa 81, the user can easily predict to which direction the sofa 81 will move according to a user manipulation.

Referring to FIG. 8B, the user terminal device 200 may additionally display direction interfaces 806, 807, 808 and 809 other than the object 81'. Here, the user terminal device 200 may control the electronic device 100 so that the sofa 81 moves to a direction corresponding to a direction interface selected by the user.

Referring to FIG. 8B, as a result of the user selecting the direction interface 809, the electronic device 100 may control the moving part so that the sofa 81 moves to the direction 812.

When the electronic device 100 is moving according to the method of FIG. 8A or FIG. 8B, the moving path may be recorded. Referring to FIG. 8A and FIG. 8B, the UI 206 indicating the recording state is being displayed on the user terminal device 200, and here, the bar 206' may flow to the right side of the UI 206.

The processor 230 may control the display 210 to display a plurality of UIs indicating a recording state for a plurality of moving paths of the electronic device 100.

In this case, if a user command for moving the electronic device 100 along at least one of the plurality of moving paths is received, the processor 230 may control the electronic device 100 to move along at least one moving path according to the user command through the communication interface 220.

Figure 9:
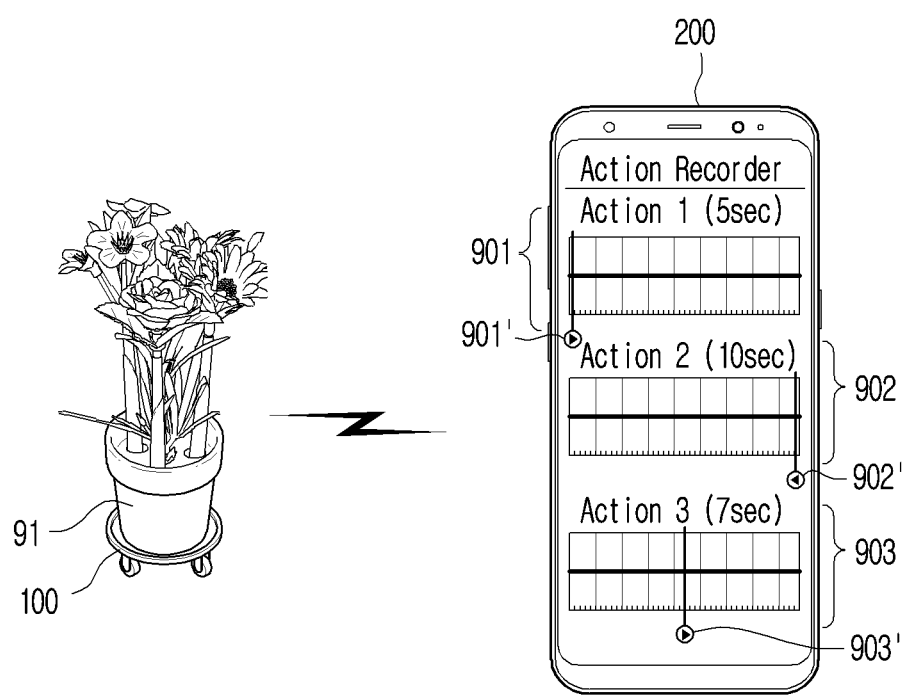
FIG. 9 is a diagram illustrating an operation example of a user terminal device providing a UI for a plurality of moving paths, according to an embodiment of the disclosure.

In this regard, FIG. 9 is a diagram for illustrating an operation example of a user terminal device providing a UI for a plurality of moving paths.

Referring to FIG. 9, the user terminal device 200 may display a plurality of UIs 901, 902 and 903 for indicating recording states of the plurality of respective moving paths (Action 1, 2, 3) recorded in the electronic device 100 attached to the flowerpot 91.

Here, if the interface 901' is selected in the user terminal device 200, the electronic device 100 that received a control signal from the user terminal device 200 may move according to Action 1, and if the interface 902' is selected, the electronic device 100 that received a control signal from the user terminal device 200 may move according to Action 2, and if the interface 903' is selected, the electronic device 100 that received a control signal from the user terminal device 200 may move according to Action 3.

In addition, the interface 903' may be located in the center point of the UI 903, and this may be a result of a temporary pause selected in the center point of the UI 903 while the electronic device 100 was travelling according to Action 3.

The communication interface 230 may perform communication with a plurality of electronic devices.

Specifically, the communication interface 230 may perform communication with a first electronic device and a second electronic device, and the processor 230 may control the display 210 to display a UI indicating a recording state for a first moving path recorded in the first electronic device and a UI indicating a recording state for a second moving path recorded in the second electronic device.

In this case, if a user command for moving the first electronic device along the first moving path is received, the processor 230 may control the first electronic device to move along the first moving path through the communication interface 220.

If a user command for moving the second electronic device along the second moving path is received, the processor 230 may control the second electronic device to move along the second moving path through the communication interface 220.

Figure 10:
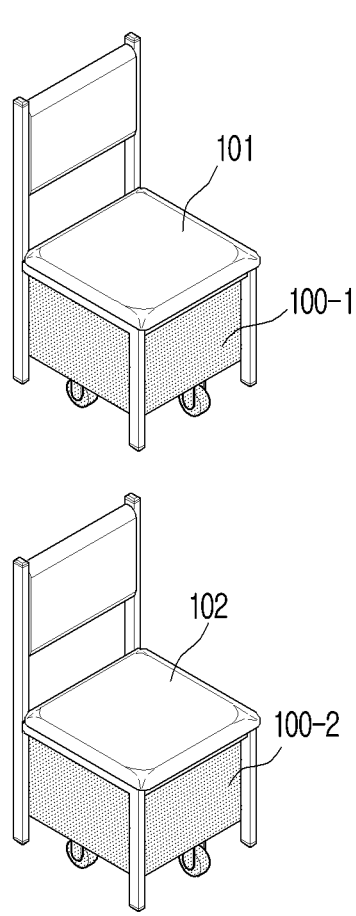
FIG. 10 is a diagram illustrating an operation example of a user terminal device providing a UI for a plurality of moving paths of a plurality of electronic devices, according to an embodiment of the disclosure.
Figure 10:
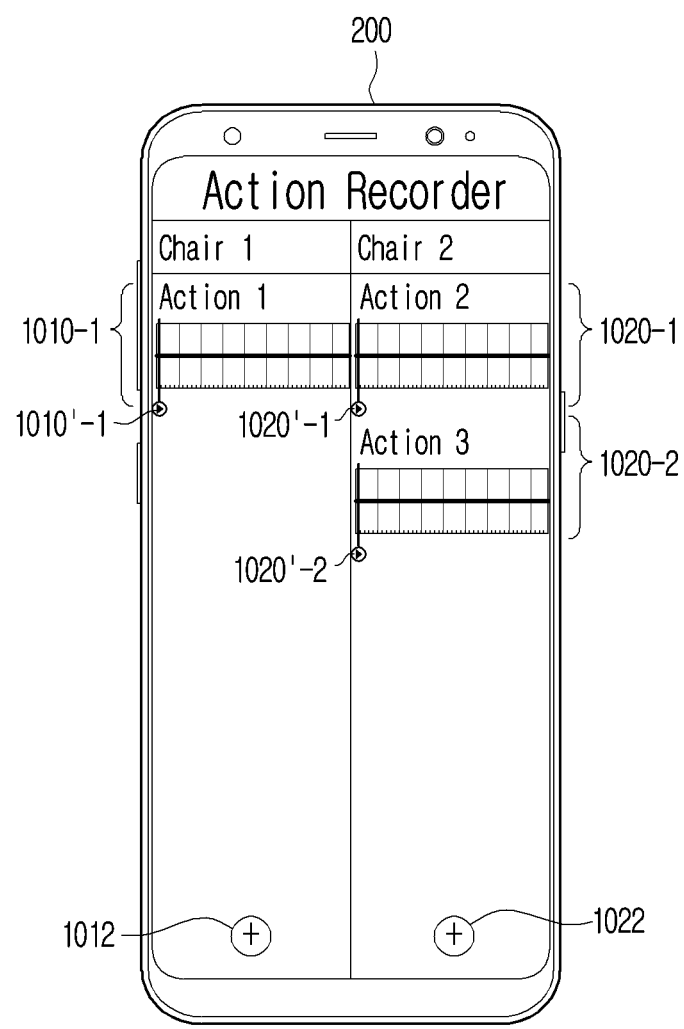

FIG. 10 is a diagram for illustrating an operation example of a user terminal device providing a UI for a plurality of moving paths of a plurality of electronic devices. FIG. 10 assumes a situation wherein an electronic device 100-1 is attached to a chair 101 (Chair 1), an electronic device 100-2 is attached to a chair 102 (Chair 2), and the electronic devices 100-1, 2 are connected with the communication interface 220.

Referring to FIG. 10, the user terminal device 200 may display a UI 1010-1 indicating the recording state of the moving path Action 1 recorded in the electronic device 100-1 attached to the chair 101 (Chair 1), and an interface 1010'-1 for selecting travelling according to Action 1. Referring to FIG. 10, the processor 230 may display an interface 1012 controlling the electronic device 100-1 attached to the chair 101 (Chair 1) to record another moving path.

Referring to FIG. 10, the user terminal device 200 may display UIs 1020-1 and 1020-2 respectively indicating the recording states of Action 2 and Action 3 which are moving paths recorded in the electronic device 100-2 attached to the chair 102 (Chair 2), and interfaces 1020'-1 and 1020'-2 corresponding to the UIs 1020-1 and 1020-2. Referring to FIG. 10, the processor 230 may display an interface 1022 for causing the electronic device 100-2 attached to the chair 102 (Chair 2) to record another moving path.

The processor 230 may, based on an order or a time sequence by which the first moving path of the first electronic device and the second moving path of the second electronic device are recorded, control the first electronic device and the second electronic device so that the first electronic device and the second electronic device respectively move along the first moving path and the second moving path through the communication interface 220.

Specifically, the processor 230 may control the display 210 to display a UI for indicating the recording state for the first moving path of the first electronic device and the recording state for the second moving path of the second electronic device as one record.

Here, when the recordings of the first electronic device and the second electronic device for the first moving path and the second moving path are completed, the processor 230 may display an interface for moving the first electronic device and the second electronic device along the first moving path for which the recording was completed and the second moving path for which the recording was completed on the UI.

Then, if a user command selecting the interface is input, the processor 230 may control the first electronic device and the second electronic device to respectively move along the first moving path for which the recording was completed and the second moving path for which the recording was completed through the communication interface 220.

Figure 11:
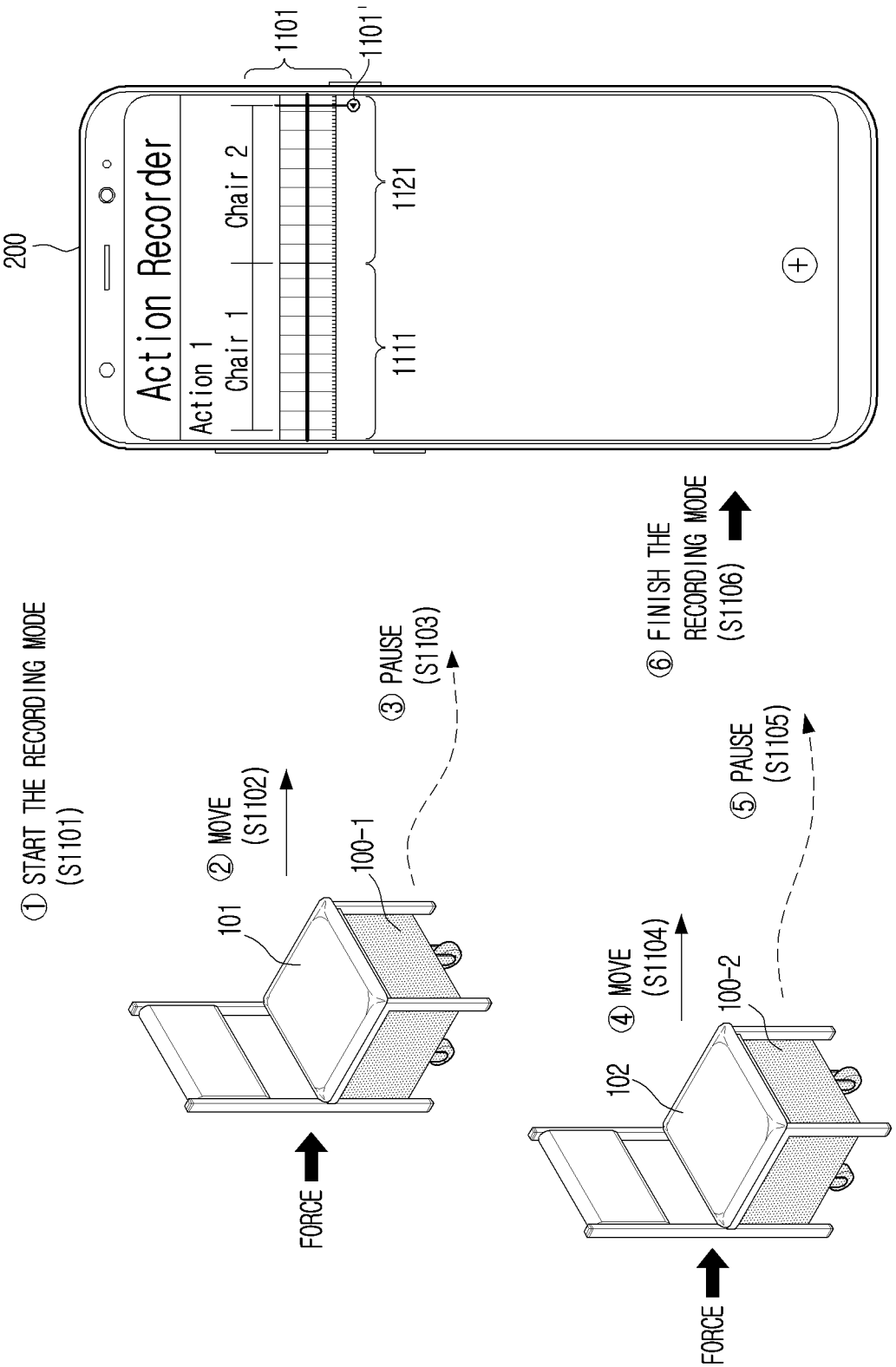
FIG. 11 is a diagram illustrating an operation example of a user terminal device storing moving paths of a plurality of electronic devices as one moving path, according to an embodiment of the disclosure.

FIG. 11 is a diagram for illustrating an operation example of a user terminal device storing moving paths of a plurality of electronic devices as one moving path.

Referring to FIG. 11, after the recording mode starts in operation S1101, if the electronic device 100-1 attached to the chair 101 (Chair 1) moves by an external force in operation S1102 and then pauses in operation S1103, the user terminal device 200 may display a UI 1111 indicating the recording state of the moving path recorded in the electronic device 100-1 attached to the chair 101 (Chair 1).

Here, in a state in which the recording state is still maintained as the user did not finish the recording mode, if the electronic device 100-2 attached to the chair 102 (Chair 2) moves by an external force in operation S1104 and then pauses in operation S1105, the user terminal device 200 may display a UI 1112 indicating the recording state of the moving path recorded in the electronic device 100-2 attached to the chair 102 (Chair 2) to succeed from the UI 1111, and thereby displaying the UIs 1111 and 1112 in one record.

When the recording mode is finished by a user command in operation S1106, a UI 1101 indicating a recording state including both of the moving path of the electronic device 100-1 and the moving path of the electronic device 100-2 may be displayed on the user terminal device 200. In this case, if the interface 1101' is selected, the electronic device 100-2 and the electronic device 100-1 may move in a corresponding manner to the order and the time by which their respective moving paths are recorded in the travel mode.

Also, in a state in which moving paths are recorded in each of the plurality of electronic devices, an embodiment wherein the plurality of electronic devices move in a corresponding manner to the respective corresponding moving paths according to the order or the time according to a user command input into the user terminal device 200 is also possible. That is, a user may arbitrarily set the time, the order, the speed, etc. by which electronic devices connected to the user terminal device 200 will move along the moving paths recorded in each electronic device through the user terminal device 200.

The processor 230 may control the first electronic device and the second electronic device so that the first electronic device and the second electronic device move along the moving path recorded in the first electronic device through the communication interface 220.

Figure 12:
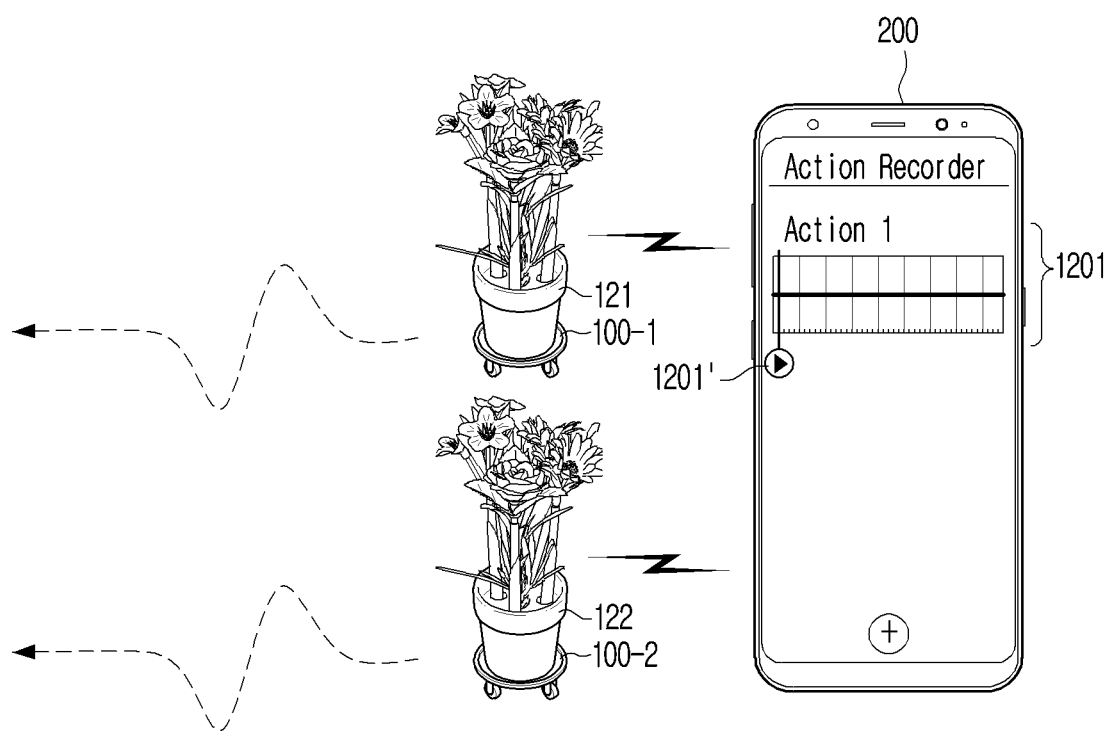
FIG. 12 is a diagram for illustrating an operation example of a user terminal device controlling moving of a plurality of electronic devices through one stored moving path, according to an embodiment of the disclosure.

FIG. 12 is a diagram for illustrating an operation example of a user terminal device controlling moving of a plurality of electronic devices through one stored moving path.

Referring to FIG. 12, the user terminal device 200 may display a UI 1201 indicating the recording state of the moving path recorded in the electronic device 100-1 attached to the flowerpot 121 and an interface 1201' corresponding thereto.

Here, if the interface 1201' is selected, the user terminal device 200 may simultaneously control not only the electronic device 100-1 but also the electronic device 100-2 attached to the flowerpot 122 to also move along the moving path Action 1 through the communication interface 220. In this case, the user terminal device 200 may be in a state of having already received a separate user command for controlling the plurality of electronic devices 100-1, 2 only with one moving path.

Figure 13:
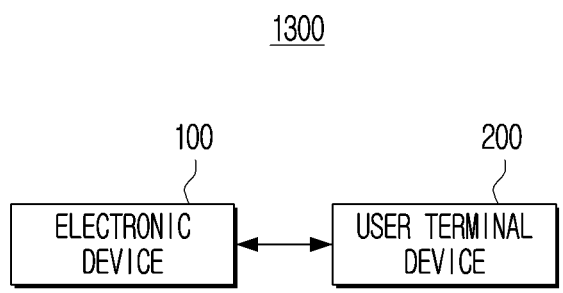
FIG. 13 is a block diagram illustrating a system including an electronic device and a user terminal device according to an embodiment of the disclosure.

FIG. 13 is a block diagram for illustrating a system including an electronic device and a user terminal device according to an embodiment of the disclosure.

The system 1300 in FIG. 13 is a system including the aforementioned electronic device 100 and user terminal device 200, and it can provide an IoT environment to a user.

Hereinafter, an operating method of an electronic device including a moving part according to the disclosure will be described through the accompanying drawings.

Figure 14:
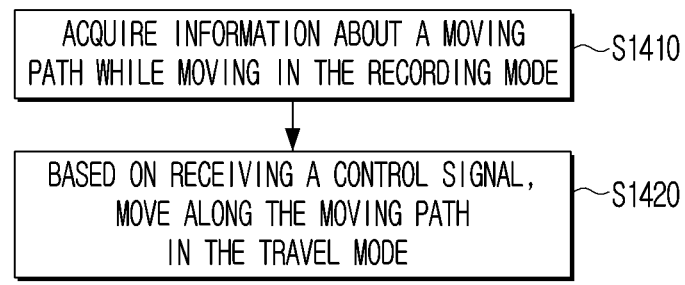
FIG. 14 is a flow chart illustrating an operating method of an electronic device including a moving part according to an embodiment of the disclosure.

FIG. 14 is a flow chart for illustrating an operating method of an electronic device including a moving part according to an embodiment of the disclosure.

Referring to FIG. 14, in the operating method according to the disclosure, while the electronic device is moving in a state wherein the operation mode of the electronic device is the recording mode, information about the moving path may be acquired in operation S1410. Specifically, while the electronic device is moving in a state wherein the operation mode of the electronic device is the recording mode, a light may be output by using light emitting elements, and when the output light is reflected from the ground and received by the optical sensor, information about the moving path of the electronic device may be acquired based on the received light and stored (e.g., recordation of the moving path).

In this case, while the electronic device is moving by an external force in the recording mode, the information about the moving path may be acquired.

Alternatively or additionally, if a control signal based on a user command for moving the electronic device is received from a user terminal device in a state wherein the operation mode of the electronic device is the recording mode, the moving part may be controlled so that the electronic device moves according to the received control signal, and the information about the moving path of the electronic device may be acquired based on the received light.

When a control signal for finishing of the recording mode is received from the user terminal device, the operation of acquiring the information about the moving path of the electronic device may be stopped, and the recording mode may be finished and the mode may be switched to the stand-by mode.

When a control signal for moving the electronic device along the recorded moving path is received from the user terminal device, the operation mode of the electronic device may be set to the travel mode, and the moving part may be controlled so that the electronic device moves along the moving path in operation S1420.

In case the moving part includes a wheel for recording and a wheel for travelling, in the operation S1410, while the electronic device is moving as the wheel for recording rotates according to an external force applied to the electronic device, information about the moving path of the electronic device may be acquired based on the received light. Then, in the operation S1420, if a control signal for making the electronic device move along the recorded moving path is received from the user terminal device, the wheel for travelling may be controlled so that the electronic device moves along the recorded moving path.

Here, the wheel for recording may be attached to the electronic device through a suspension, and the wheel for travelling may be attached to the electronic device without a suspension. In this case, in the operating method according to the disclosure, in a state wherein the operation mode of the electronic device is a stand-by mode, the wheel for recording and the wheel for driving may be controlled to be separated from the ground, and if the operation mode of the electronic device is changed from the stand-by mode to the recording mode, the wheel for recording between the wheel for recording and the wheel for driving may be controlled to descend to the direction of the ground. Also, if the operation mode of the electronic device is changed from the stand-by mode to the recording mode, the wheel for recording and the wheel for driving may be controlled to descend to the direction of the ground.

Figure 15A:
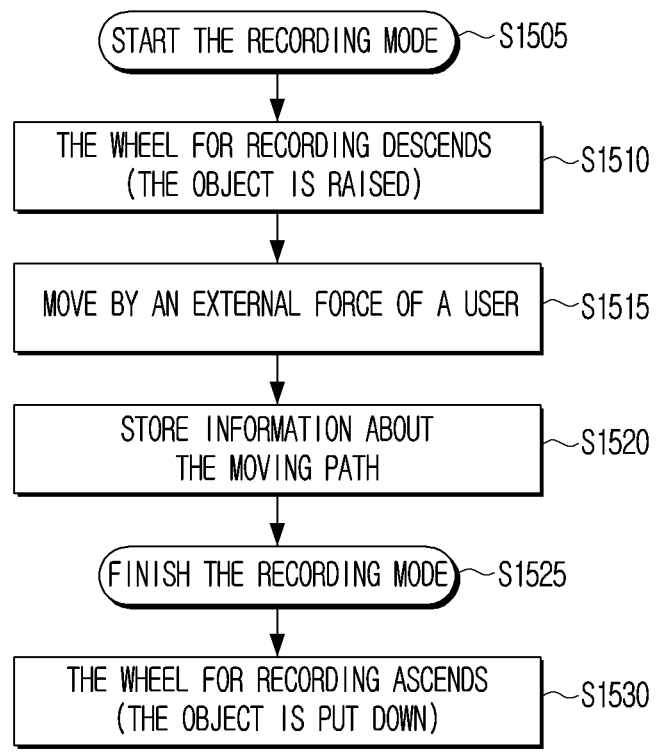
FIG. 15A is a flow chart illustrating a specific example of an operating method of an electronic device that operates in a recording mode, according to an embodiment of the disclosure.

FIG. 15A is a flow chart for illustrating a specific example wherein an operating method of an electronic device operates in a recording mode.

Referring to FIG. 15A, if the recording mode starts according to a user command input into the electronic device or a user terminal device in operation S1505, the wheel for recording may be made to descend in operation S1510.

Here, as the wheel for recording contacts the ground, an object attached to the electronic device (e.g., a sofa, a chair, etc.) may be raised from the ground.

If the object and the electronic device are moved by an external force in a state wherein the electronic device is in the recording mode in operation S1515, the moving path may be identified by using a sensor part including light emitting elements and an optical sensor, and the moving path may be recorded as information about the identified moving path is stored in operation S1520.

Here, when the recording mode is finished according to a user command input into the user terminal device in operation S1525, as the mode is the stand-by mode, the wheel for recording may be made to ascend so that the wheel for recording becomes far from the ground again in operation S1530. Then, the object may contact the ground again.

In case the electronic device is attached to the lower part of a heavy object, if the wheel for recording keeps contacting the ground in the stand-by mode, the wheel for recording is highly likely to be damaged by the weight of the object. Accordingly, there is an effect that the wheel for recording is controlled to be separated from the ground in the stand-by mode.

Figure 15B:
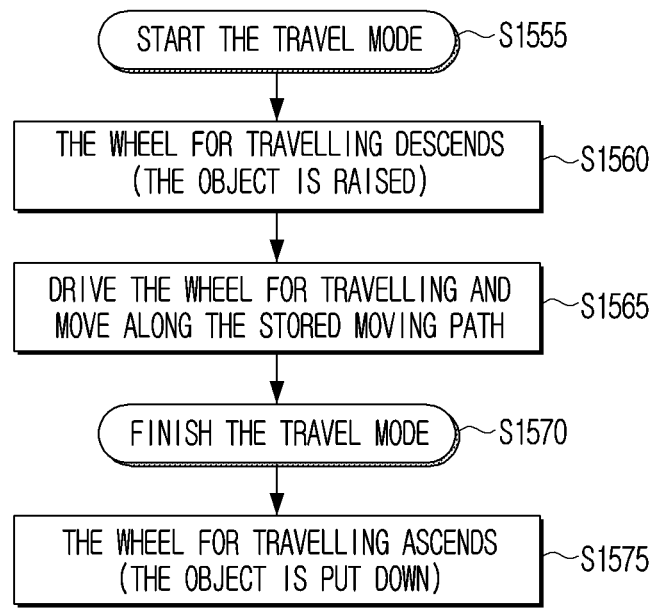
FIG. 15B is a flow chart for illustrating a specific example of an operating method of an electronic device that operates in a travel mode according to an embodiment of the disclosure.

FIG. 15B is a flow chart for illustrating a specific example wherein an operating method of an electronic device operates in a travel mode.

Referring to FIG. 15B, when a control signal for moving along a recorded moving path is received from a user terminal device, the operation mode may be changed from the stand-by mode to the travel mode in operation S1555. Here, the wheel for travelling may be descended so that the wheel for traveling contacts the ground in operation S1560, and in case an object cannot be lifted just with the wheel for travelling or the number of wheels for travelling is insufficient, a wheel other than the wheel for travelling (e.g., a wheel for recording) may be made to descend together. As a result, the object may be lifted. For example, if an object is too heavy such that the object to be lifted only by the travelling wheel, one or more wheels for recording or other wheels may be descended together with the travelling wheel to lift up the object.

Then, a driving force may be transmitted to the wheel for travelling, and the electronic device may move according to the recorded moving path in operation S1565. When travelling according to the recorded moving path is completed, the travel mode may be finished in operation S1570.

In this case, as the travelling mode is finished and the mode is switched to the stand-by mode, the wheel for travelling that was made to descend may be made to ascend again in operation S1575. Here, the wheel other than the wheel for travelling that descended together with the wheel for travelling may be made to ascend together. When the object is lifted from the ground at the time point when the wheel for travelling descended, the object may descend to the ground again as the wheel for travelling ascends.

In addition, in case the moving part include a first wheel for recording and a second wheel for travelling, while the electronic device is moving as the first wheel and the second wheel rotate according to an external force applied to the electronic device, information about the moving path of the electronic device may be acquired based on the received light, and if a control signal is received from the user terminal device, the second wheel may be controlled so that the electronic device moves along the recorded moving path.

The operating method of an electronic device described above through FIG. 14, FIG. 15A, and FIG. 15B may be implemented by the electronic device 100 illustrated and described through FIG. 2A.

The one or more embodiments described above may be implemented in a recording medium that is readable by computers or devices similar to computers, by using software, hardware, or a combination of software and hardware.

According to implementation by hardware, the embodiments described in the disclosure may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors or an electronic unit for performing various functions.

In some cases, the embodiments described in this specification may be implemented as the processor itself. According to implementation by software, the embodiments such as procedures and functions described in this specification may be implemented as separate software modules. Each of the software modules may perform one or more functions and operations described in this specification.

Computer instructions for performing processing operations at the electronic device 100 or the user terminal device 200 according to the aforementioned various embodiments of the disclosure may be stored in a non-transitory computer-readable medium. Computer instructions stored in such a non-transitory computer-readable medium make the processing operations at the electronic device 100 or the user terminal device 200 according to the aforementioned various embodiments performed by a specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer-readable medium such as a CD, a DVD, a hard disc, a blue-ray disc, a USB, a memory card, a ROM and the like.

Also, while the embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. An electronic device comprising:
a moving part comprising a wheel for recording and a wheel for travelling, the wheel for recording being attached to the electronic device through a suspension, and the wheel for travelling being attached to the electronic device without a suspension;
a light emitting element;
an optical sensor;
a memory;
a communication interface; and
a controller configured to:

based on an operation mode of the electronic device being a stand-by mode, control the wheel for recording and the wheel for travelling to be separated from the ground;

based on the operation mode of the electronic device being changed from the stand-by mode to the recording mode, control the wheel for recording to descend in a direction toward the ground;

based on the electronic device moving by the wheel for recording according to an external force applied to the electronic device and being in a recording mode, output light from the light emitting element;

receive the light reflected from a ground by the optical sensor;

acquire at least one image based on the received light;

acquire information about a moving path of the electronic device by comparing the at least one acquired image with at least one previous image acquired in the recording mode;

store the acquired information in the memory;

based on receiving a control signal for moving the electronic device along the moving path from a user terminal device through the communication interface, set the operation mode of the electronic device as a travel mode;

based on the operation mode of the electronic device being changed from the stand-by mode to the travel mode, control the wheel for recording and the wheel for travelling to descend in the direction toward the ground; and control the wheel for travelling so that the electronic device moves along the moving path.

2. The electronic device of claim 1,
wherein the moving part comprises a first wheel for recording and a second wheel for recording and driving, and
wherein the controller is further configured to:
based on the electronic device moving as the first wheel and the second wheel rotate according to an external force applied to the electronic device and being in the recording mode, acquire information about the moving path of the electronic device based on the received light and store the information in the memory; and
based on receiving the control signal from the user terminal device through the communication interface, set the operation mode of the electronic device to the travel mode, and control the second wheel so that the electronic device moves along the moving path.

3. The electronic device of claim 1,
wherein the controller is further configured to:
based on receiving the control signal for moving the electronic device from the user terminal device through the communication interface, control the moving part so that the electronic device moves according to the received control signal; and
acquire information about the moving path of the electronic device based on the received light and store the information in the memory.

4. The electronic device of claim 1,
wherein the controller is further configured to:
based on the operation mode of the electronic device being in the recording mode, acquire information about a plurality of moving paths and store the information in the memory, and control the moving part so that the electronic device moves along a moving path corresponding to the received control signal among the plurality of moving paths.

5. The electronic device of claim 1,
wherein the controller is further configured to:
acquire information about the moving path and a moving speed of the electronic device and store the information in the memory in the recording mode, and based on receiving the control signal for moving the electronic device along the moving path from a user terminal device through the communication interface, set the operation mode of the electronic device to the travel mode, and control the moving part so that the electronic device moves according to the moving path and the moving speed.

6. A user terminal device comprising:
a display;
a communication interface performing communication with an electronic device; and
a processor configured to:
based on an operation mode of the electronic device being a recording mode, control the display to display a plurality of user interfaces (UIs) indicating a recording state for a plurality of moving paths of the electronic device;

based on recording of the moving path that the electronic device acquired based on a plurality of images acquired in the recording mode being completed, display an interface for moving the electronic device along the moving path;

based on receiving a user command selecting the interface, set the operation mode as a travel mode and transmit a control signal for controlling the electronic device to move along the moving path to the electronic device through the communication interface;

based on receiving a user command for moving the displayed object in one direction, transmit a control signal for controlling the electronic device to move in the one direction, to the electronic device through the communication interface; and based on receiving a user command for moving the electronic device along at least one of the plurality of moving paths, transmit a control signal for controlling the electronic device to move along the at least one moving path, to the electronic device through the communication interface.

7. The user terminal device of claim 6,
wherein the communication interface performs communication with a first electronic device and a second electronic device, and
wherein the processor is further configured to:
control the display to display a first UI indicating a recording state for a first moving path recorded in the first electronic device and a second UI indicating a recording state for a second moving path recorded in the second electronic device;

based on receiving a first user command for moving the first electronic device along the first moving path, transmit a first control signal for controlling the first electronic device to move along the first moving path, to the first electronic device through the communication interface; and based on receiving a second user command for moving the second electronic device along the second moving path, transmit a second control signal for controlling the second electronic device to move along the second moving path, to the second electronic device through the communication interface.

8. The user terminal device of claim 6,
wherein the communication interface performs communication with the first electronic device and the second electronic device, and
wherein the processor is further configured to:
   based on an order or a time sequence by which the first moving path and the second moving path are recorded, control the first electronic device and the second electronic device so that the first electronic device and the second electronic device respectively move along the first moving path and the second moving path through the communication interface.

9. The user terminal device of claim 8,
wherein the processor is further configured to:
   control the display to display a third UI for indicating the recording state for the first moving path of the first electronic device and the recording state for the second moving path of the second electronic device as one record;
   based on the recordings of the first electronic device and the second electronic device for the first moving path and the second moving path being completed, display an interface for moving the first electronic device and the second electronic device along the first moving path for which the recording is completed and the second moving path for which the recording is completed on the UI; and
   based on receiving a user command selecting the interface, transmit a first control signal for controlling the first electronic device and a second control signal for controlling the second electronic device to respectively move along the first moving path and the second moving path through the communication interface.

10. The user terminal device of claim 6,
wherein the communication interface performs communication with the first electronic device and the second electronic device, and
wherein the processor is further configured to:
   control the first electronic device and the second electronic device so that the first electronic device and the second electronic device move along a moving path recorded in the first electronic device through the communication interface.

11. An operating method of an electronic device including a moving part including a wheel for recording and a wheel for travelling, the wheel for recording being attached to the electronic device through a suspension, and the wheel for travelling being attached to the electronic device without a suspension, the method comprising:
   based on an operation mode of the electronic device being a stand-by mode, controlling the wheel for recording and the wheel for travelling to be separated from the ground;
   based on the operation mode of the electronic device being changed from the stand-by mode to the recording mode, controlling the wheel for recording to descend in a direction toward the ground;
   based on the electronic device moving by the wheel for recording according to an external force applied to the electronic device and being in a recording mode, outputting light from a light emitting element;
   receiving the light reflected from a ground by an optical sensor;
   acquiring at least one image based on the received light;
   acquiring information about a moving path of the electronic device by comparing the at least one acquired image with at least one previous image acquired in the recording mode
   based on receiving a control signal for moving the electronic device along the moving path from a user terminal device, setting the operation mode of the electronic device as a travel mode;
   based on the operation mode of the electronic device being changed from the stand-by mode to the travel mode, controlling the wheel for recording and the wheel for travelling to descend in the direction toward the ground; and
   controlling the wheel for travelling so that the electronic device moves along the moving path.

* * * * *